United States Patent
Takano et al.

(10) Patent No.: US 9,738,350 B2
(45) Date of Patent: Aug. 22, 2017

(54) DEVICE FOR REDUCING FRICTIONAL RESISTANCE, SHIP COMPRISING THE DEVICE, AND METHOD OF REDUCING FRICTIONAL RESISTANCE OF SHIP

(71) Applicant: MITSUBISHI HEAVY INDUSTRIES, LTD., Tokyo (JP)

(72) Inventors: Shinichi Takano, Tokyo (JP); Chiharu Kawakita, Tokyo (JP); Shinsuke Sato, Tokyo (JP); Yoichiro Kodan, Tokyo (JP); Mitsuhiro Kawano, Tokyo (JP); Shuji Mizokami, Tokyo (JP); Seijiro Higasa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 54 days.

(21) Appl. No.: 14/911,182

(22) PCT Filed: Oct. 17, 2014

(86) PCT No.: PCT/JP2014/077706
§ 371 (c)(1),
(2) Date: Feb. 9, 2016

(87) PCT Pub. No.: WO2015/060217
PCT Pub. Date: Apr. 30, 2015

(65) Prior Publication Data
US 2016/0185423 A1    Jun. 30, 2016

(30) Foreign Application Priority Data
Oct. 23, 2013   (JP) ................................. 2013-220491

(51) Int. Cl.
*B63B 1/38* (2006.01)

(52) U.S. Cl.
CPC .......... *B63B 1/38* (2013.01); *B63B 2001/387* (2013.01); *Y02T 70/122* (2013.01)

(58) Field of Classification Search
CPC ................ B63B 1/38; B63B 2001/382; B63B 2001/385; B63B 2001/387; Y02T 70/122
(Continued)

(56) References Cited

U.S. PATENT DOCUMENTS 4,135,469 A * 1/1979 Rimppi .................... B63H 1/28
                                                      114/67 A
4,840,589 A    6/1989 Breaux
(Continued)

FOREIGN PATENT DOCUMENTS

GB    2065036 A    6/1981
JP    H08-310480 A    11/1996
(Continued)

OTHER PUBLICATIONS

PCT/ISA/210, "International Search Report for International Application No. PCT/JP2014/077706," Jan. 13, 2015.
(Continued)

*Primary Examiner* — Ajay Vasudeva
(74) *Attorney, Agent, or Firm* — Manabu Kanesaka; Benjamin Hauptman; Kenneth Berner

(57) ABSTRACT

A device for reducing frictional resistance includes: a chamber which is provided to a draft part of a hull and in which blowing holes blowing out air into the water of the outside of the hull from different positions to each other in a height direction of the hull are formed; a supply pipe supplying the air to an internal space of the chamber; and a distributor provided to each of the blowing holes, and guiding a part of the air, which was supplied inside the chamber from the supply pipe, to each of the blowing holes. The plurality of distributors has a flow-amount adjuster adjusting a flow (Continued)

amount of the air guided to the blowing hole corresponding to each of the distributors so that the flow amount of the air blown out from the plurality of blowing holes is equalized in each of the blowing holes.

22 Claims, 23 Drawing Sheets

(58) Field of Classification Search
  USPC .................................................. 114/67 A
  See application file for complete search history.

(56) References Cited

U.S. PATENT DOCUMENTS

| | | | |
|---|---|---|---|
| 8,381,668 B2* | 2/2013 | Takano | B63B 1/38 |
| | | | 114/67 A |
| 2009/0260561 A1 | 10/2009 | Takahashi | |
| 2010/0018452 A1 | 1/2010 | Takahashi | |

FOREIGN PATENT DOCUMENTS

| | | | |
|---|---|---|---|
| JP | H09-207873 A | | 8/1997 |
| JP | 10109685 A | * | 4/1998 |
| JP | 11227675 A | * | 8/1999 |
| JP | 2011-110978 A | | 6/2011 |
| JP | 2012-166704 A | | 9/2012 |
| JP | 2014073812 A | * | 4/2014 |
| WO | 2012/133625 A1 | | 10/2012 |

OTHER PUBLICATIONS

PCT/ISA/237, "Written Opinion of the International Searching Authority for International Application No. PCT/JP2014/077706," Jan. 13, 2015.

Europe Patent Office, "Search Report for European Patent Application No. 14825082.2," Sep. 24, 2015.

Europe Patent Office, "Decision to Grant for European Patent Application No. 14825082.2," Nov. 10, 2016.

* cited by examiner

DEVICE FOR REDUCING FRICTIONAL RESISTANCE, SHIP COMPRISING THE DEVICE, AND METHOD OF REDUCING FRICTIONAL RESISTANCE OF SHIP

TECHNICAL FIELD

The present invention relates to a device for reducing frictional resistance, which reduces frictional resistance of a hull by blowing an air into the water of the outside of the hull, a ship comprising the device, and a method of reducing frictional resistance of the ship.

Priority is claimed on Japanese Patent Application No. 2013-220491, filed Oct. 23, 2013, the contents of which are incorporated herein by reference.

BACKGROUND ART

As a device for reducing frictional resistance, which reduces frictional resistance of a hull by blowing an air into the water of the outside of the hull, for example, there is a device described in Patent Document 1. This device for reducing the frictional resistance includes a chamber in which a plurality of blowing holes blowing an air into the water of the outside of the hull are formed. An air pressure inside the chamber is constant in every location, but a water pressure increases in the water outside the chamber along with an increasing of the water depth. Thus, when the diameter of the blowing holes is constant, the flow amount of the air blowing from the blowing hole placed in a deep position of the water depth is less than the flow amount of the air blowing from the blowing hole placed in a shallow position of the water depth. Accordingly, in the present invention, the opening area of the blowing hole placed in a deep position of the water depth is larger than the opening area of the blowing hole placed in a shallow position of the water depth, and thereby, the flow amount of the air blowing from each of the blowing holes is equalized.

PRIOR ART DOCUMENTS

Patent Documents

[Patent Document 1] Japanese Unexamined Patent Application, First Publication No. 2011-110978

DISCLOSURE OF THE INVENTION

Problems to be Solved by the Invention

In art described in the Patent Document 1, the flow amount of the air blowing from each of the blowing holes can be equalized, and frictional resistance of the hull can be reduced.

However, in the marine industry, a further reduction of a frictional resistance is desired.

The present invention provides an art capable of further reducing the frictional resistance of the hull.

Means for Solving the Problem (1) A device for reducing frictional resistance of a ship according to a first aspect of the invention includes:
a chamber which is provided to a draft part of a hull and in which a plurality of blowing holes blowing out a gas into the water of the outside of the hull from different positions to each other in a height direction of the hull are formed;
a supply pipe that supplies the gas to an internal space of the chamber; and
a plurality of distributors, each of which is provided at least to each of the plurality of blowing holes except for the blowing hole placed at the lowest position in the height direction of the plurality of blowing holes, the distributor guiding a part of the gas, which is supplied into the chamber from the supply pipe, to each of the blowing holes,
wherein each of the plurality of distributors has a flow-amount adjuster that adjusts a flow amount of the gas guided to the blowing hole corresponding to the distributor so that the flow amount of the gas blown out from the plurality of blowing holes is equalized in each of the blowing holes.

The lower the height position of the blowing hole is, the higher water pressure the blowing hole is subjected to from the outside of the hull, and the water resistance with respect to the gas blown out from the blowing hole into the water increases. Thus, in the device for reducing frictional resistance, the flow amount of the gas blown out from the plurality of blowing holes placed at different heights from each other is equalized. In addition, in the device for reducing frictional resistance, since the shapes and areas of the opening of the plurality of blowing holes can be the same, the dispersion along the outer wall of the hull of the air blown out from the plurality of blowing holes can be equalized.

Accordingly, in the device for reducing frictional resistance, since the dispersion along the outer wall of the hull of the air blown out from the plurality of blowing holes is equalized along with the flow amount of the air blown out from the plurality of blowing holes being equalized, a distribution of the air along the outer wall of the hull can be equalized. Thus, in the device for reducing frictional resistance, the frictional resistance of the hull can be further reduced.

(2) The device for reducing frictional resistance of a ship according to a second aspect of the present invention is the device described in (1), wherein
the distributor is provided to all of the plurality of blowing holes formed in the chamber.

(3) The device for reducing frictional resistance of a ship according to a third aspect of the present invention is the device described in (1) or (2),
wherein the higher the height position of the corresponding blowing hole is, the more the flow-amount adjuster of the plurality of distributors reduces the flow amount of the gas guided to the corresponding blowing hole.

In the device for reducing frictional resistance, the higher the height position of the blowing hole corresponding to the distributor is, the more the flow-amount adjuster of the distributor reduces the flow amount of the gas guided to the corresponding blowing hole. Thus, in the device for reducing frictional resistance, the flow amount of the air blown out from the plurality of blowing holes placed at different heights from each other is equalized.

(4) The device for reducing frictional resistance of a ship according to a fourth aspect of the present invention is the device described in (3), wherein the plurality of distributors comprises:
a partition member sectioning the internal space of the chamber to a supply-pipe-side space communicating with an opening of the supply pipe connecting to the chamber and a partial space including a space of the corresponding blowing hole, and wherein the flow-amount adjuster is provided to the partition member.

(5) The device for reducing frictional resistance of a ship according to a fifth aspect of the present invention is the device described in (4) having the partition member, the flow-amount adjuster of the distributor is configured of at least one penetration hole formed in the partition member and penetrating to the partial space side from the supply-pipe-side space, and the number of penetration holes of each of the plurality of distributors is different for each of the plurality of distributors.

(6) The device for reducing frictional resistance of a ship according to a sixth aspect of the present invention is the device described in (4) having the partition member, the flow-amount adjuster of the distributor is formed in the partition member and is configured of a penetration hole penetrating to the partial space side from the supply-pipe-side space, and an opening area of the penetration hole of each of the plurality of distributors is different for each of the plurality of distributors.

(7) The device for reducing frictional resistance of a ship according to a seventh aspect of the present invention is the device described in (5) or (6) formed the penetration holes to the partition member, and of plate members forming the chamber, the penetration hole is not formed on an extension of the blowing hole in the penetration direction of the blowing hole in an outer-wall plate in which the blowing hole corresponding to the distributor is formed.

(8) The device for reducing frictional resistance of a ship according to an eighth aspect of the present invention is the device described in (5) or (6) formed the penetration holes to the partition member, and a change-direction member changing the flow direction of the gas from the penetration hole is provided in the partial space.

(9) The device for reducing frictional resistance of a ship according to a ninth aspect of the present invention is the device described in (4) having the partition member, the flow-amount adjuster of each of the plurality of distributors is a screen provided to the partition member and formed a plurality of openings through which the gas passes to the partial space side from the supply-pipe-side space, and a size of openings of the screen of each of the plurality of distributors is different for each of the plurality of distributors.

(10) The device for reducing frictional resistance of a ship according to a tenth aspect of the present invention is the device described in (4) having the partition member, the flow-amount adjuster of each of the plurality of distributors is configured of a pipe which is provided to the partition member and through which the gas passes to the partial space side from the supply-pipe-side space, and an opening area of the pipe of each of the plurality of distributors is different for each of the plurality of distributors.

(11) The device for reducing frictional resistance of a ship according to a eleventh aspect of the present invention is the device described in (4) having the partition member, the flow-amount adjuster of each of the plurality of distributors is configured of a pipe which is provided to the partition member and through which the gas passes to the partial space side from the supply-pipe-side space, and a length of the pipe of each of the plurality of distributors is different for each of the plurality of distributors.

(12) The device for reducing frictional resistance of a ship according to a twelfth aspect of the present invention is the device described in (4) having the partition member, the flow-amount adjuster of each of the plurality of distributors is configured of a valve which is provided to the partition member and through which the gas passes to the partial space side from the supply-pipe-side space, and a valve opening position of the valve of each of the plurality of distributors is different for each of the plurality of distributors.

(13) The device for reducing frictional resistance of a ship according to a thirteenth aspect of the present invention is the device described in any one of (4) to (12) having the partition member, the partition member of the distributor includes a cylinder and a cover, wherein the cylinder forms the partial space in the chamber with one end of the cylinder being connected to the outer-wall plate in which the corresponding blowing hole is formed and which is included in the plate members forming the chamber, and wherein the cover covers an opening of the other end of the cylinder.

(14) The device for reducing frictional resistance of a ship according to a fourteenth aspect of the present invention is the device described in any one of (4) to (12) having the partition member, the partition member of the plurality of distributors includes:

an internal-space-partition plate that divides the internal space of the chamber into two spaces consisting of the supply-pipe-side space and a blowing-side space defined as another space, and a blowing-side-partition plate that divides the blowing-side space into a plurality of partial spaces by sectioning the blowing-side space with respect to each blowing hole, wherein the flow-amount adjuster is provided to the internal-space-partition plate.

(15) The device for reducing frictional resistance of a ship according to a fifteenth aspect of the present invention is the device described in any one of (4) to (6) and (9) to (12) having the partition member, the partition member of the distributor comprises:

a facing plate facing the blowing hole corresponding to the distributor and facing a portion around the corresponding blowing hole in the outer-wall plate, and the facing plate made contact with the outer-wall plate, wherein the flow-amount adjuster is provided to the facing plate.

(16) The device for reducing frictional resistance of a ship according to a sixteenth aspect of the present invention is the device described in (4) having the partition member, the partition member of the distributor comprises:

a facing plate facing the blowing hole corresponding to the distributor and a portion around the blowing hole in the outer-wall plate with a clearance between the facing plate and the outer-wall plate, a clearance-maintaining member maintaining the clearance between the facing plate and the outer-wall plate, wherein the flow-amount adjuster is configured of an opening provided between the edge of the facing plate and the outer-wall plate, and wherein an area of the opening of each of the plurality of distributors is different for each of the plurality of distributors.

(17) The device for reducing frictional resistance of a ship according to a seventeenth aspect of the present invention is the device described in any one of (1) to (16), and shapes and opening areas of an opening of each of the plurality of blowing holes are the same with each other.

(18) The device for reducing frictional resistance of a ship according to a eighteenth aspect of the present invention is the device described in any one of (1) to (17), wherein the blowing holes at the same position in the height direction with each other are formed in the chamber, and the distributor is provided to each of the blowing holes at the same position in the height direction with each other.

(19) A ship according to a nineteenth aspect of the invention includes:

the hull, and the device for reducing frictional resistance of a ship described in any one of (1) to (18).

(20) A method for reducing frictional resistance of a ship according to a twentieth aspect of the invention comprises:

a gas supplying step supplying a gas to an internal space of a chamber, the chamber which is provided to a draft part of a hull and in which a plurality of blowing holes blowing the gas into the water of the outside of the hull from different positions to each other in a height direction of the hull are formed; and a gas distributing step guiding a part of the gas, which is supplied inside the chamber, to the blowing holes in each of the plurality of blowing holes, wherein the gas distributing step comprises the step of adjusting a flow amount of the gas guided to the blowing hole so that the flow amount of the gas blown out from the plurality of blowing holes is equalized in each of the plurality of blowing holes.

The lower the height position of the blowing hole is, the higher water pressure the blowing hole is subjected to from the outside of the hull, and the water resistance with respect to the gas blown out from the blowing hole into the water increases. Thus, in the method for reducing frictional resistance, the flow amount of the gas blown out from the plurality of blowing holes placed at different heights from each other is equalized. In addition, in the method for reducing frictional resistance, since the shapes and areas of the opening of the plurality of blowing holes can be the same, the dispersion along the outer wall of the hull of the air blown out from the plurality of blowing holes can be equalized.

Accordingly, in the method for reducing frictional resistance, since the dispersion along the outer wall of the hull of the air blown out from the plurality of blowing holes is equalized along with the flow amount of the air blown out from the plurality of blowing holes being equalized, a distribution of the air along the outer wall of the hull can be equalized. Thus, in the method for reducing frictional resistance, the frictional resistance of the hull can be further reduced.

(21) The method for reducing frictional resistance of a ship according to a twenty-first aspect of the present invention is the method described in (20), wherein in the gas distributing step, the higher the height position of the corresponding blowing hole is, the more the flow amount of the gas guided to the corresponding blowing hole is reduced.

In the method for reducing frictional resistance, in the gas distributing step, the higher the height position of the blowing hole corresponding to the distributor is, the more the flow amount of the gas guided to the corresponding blowing hole is reduced. Thus, in the method for reducing frictional resistance, the flow amount of the air blown out from the plurality of blowing holes placed at different heights from each other is equalized.

(22) The method for reducing frictional resistance of a ship according to a twenty-second aspect of the present invention is the method described in (20) or (21), wherein in the gas distributing step, the higher the height position of the blowing hole is, the more a pressure loss of the gas, which is supplied into the chamber, increases while being guided to the blowing hole.

Effects of the Invention

According to the above described device for reducing frictional resistance, ship including such a device, and method of reducing frictional resistance of the ship, equalization of the flow amount of the air blown out from the plurality of blowing holes and equalization of dispersing along the outboard-wall of the air blown out from the plurality of blowing holes can be achieved. Therefore, the frictional resistance of the ship can be further reduced.

EMBODIMENTS OF THE INVENTION

Hereinafter, each embodiment of the present invention will be described with referring drawings.

First Embodiment

A ship as a first embodiment of the present invention will be described with referring FIGS. 1 to 5.

Figure 1:
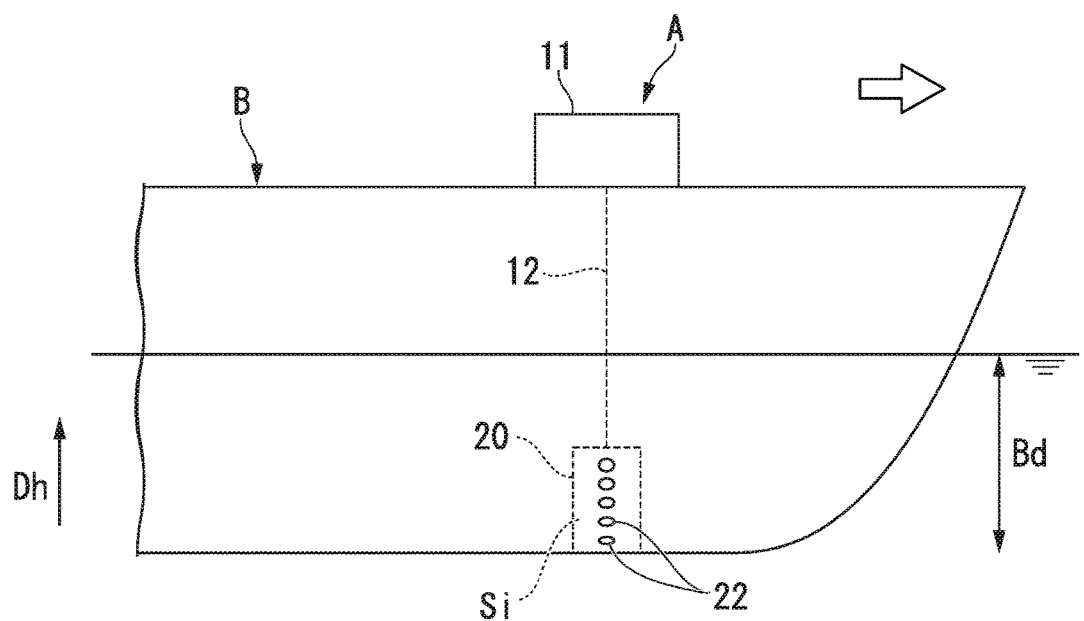
FIG. 1 is an explanatory view showing a structure of a ship according to a first embodiment of the present invention.
Figure 2:
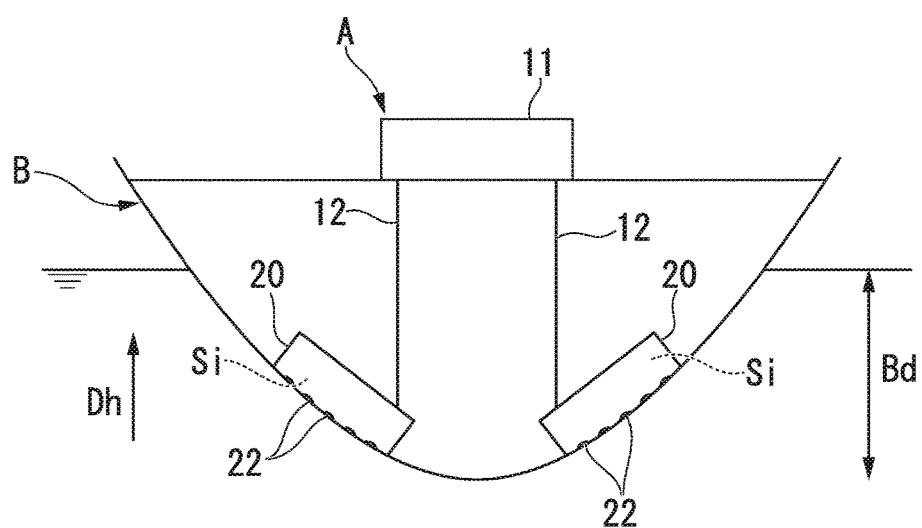
FIG. 2 is a cross-sectional view of the ship according to the first embodiment of the present invention.

As shown in FIGS. 1 and 2, the ship of the present embodiment includes a hull B, and a device for reducing frictional resistance A reducing a frictional resistance by blowing out a gas into the water outside of the hull.

The device for reducing frictional resistance A includes air-supply device 11, a chamber 20 blowing out air to the outside of the hull, and a supply pipe 12 guiding air from the air-supply device 11 to the chamber 20.

The air-supply device 11 has a blower or compressor blowing out a compressed air by suctioning the air. The compressed air generated in the air-supply device 11 is supplied to an internal space Si of the chamber 20 via the supply pipe 12.

Figure 3:
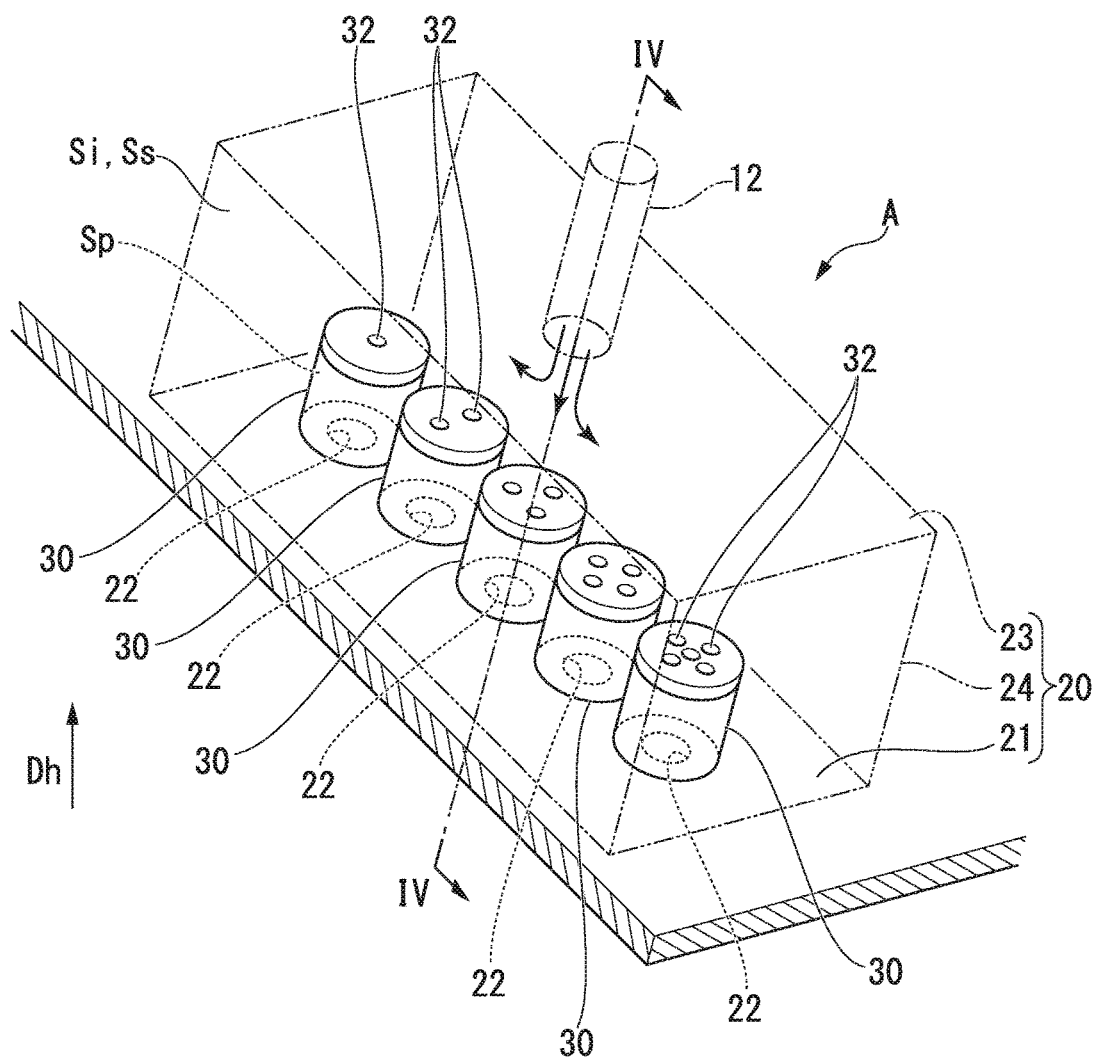
FIG. 3 is a perspective view of a relevant part of a device for reducing frictional resistance according to the first embodiment of the present invention.

The chamber 20 is provided in a draft part Bd of the hull B and a part where a width of the hull B varies when a position of a height direction Dh of the hull B is changed by a change of the width of the hull B. Thus, the chamber 20 is provided in the draft part Bd of the hull B and a part where an outer wall of the hull is inclined with respect to a horizontal surface. As shown in FIG. 3, the chamber 20 includes an outer-wall plate 21 inclining with respect to the horizontal surface in a part of the outer wall of the hull, a supply-pipe-connecting plate 23 disposing inside the hull with respect to the outer-wall plate 21 and facing the outer-wall plate 21 with a clearance, and a peripheral-wall plate 24 extending to the outer-wall plate 21 from the outer circumferential edge of the supply-pipe-connecting plate 23. The chamber 20 forms the internal space Si by enclosing it with the outer-wall plate 21, the supply-pipe-connecting plate 23 and the peripheral-wall plate 24.

Figure 4:
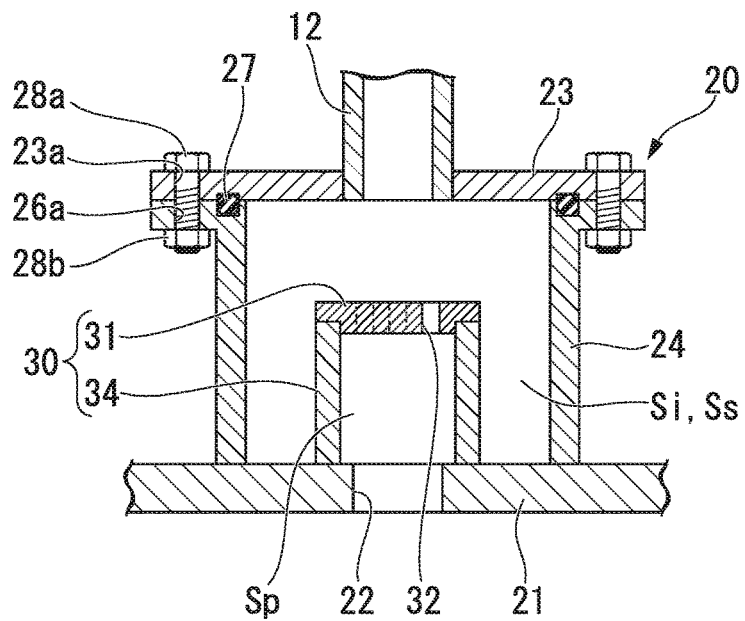
FIG. 4 is a cross-sectional view of the IV-IV line in FIG. 3.
Figure 5:
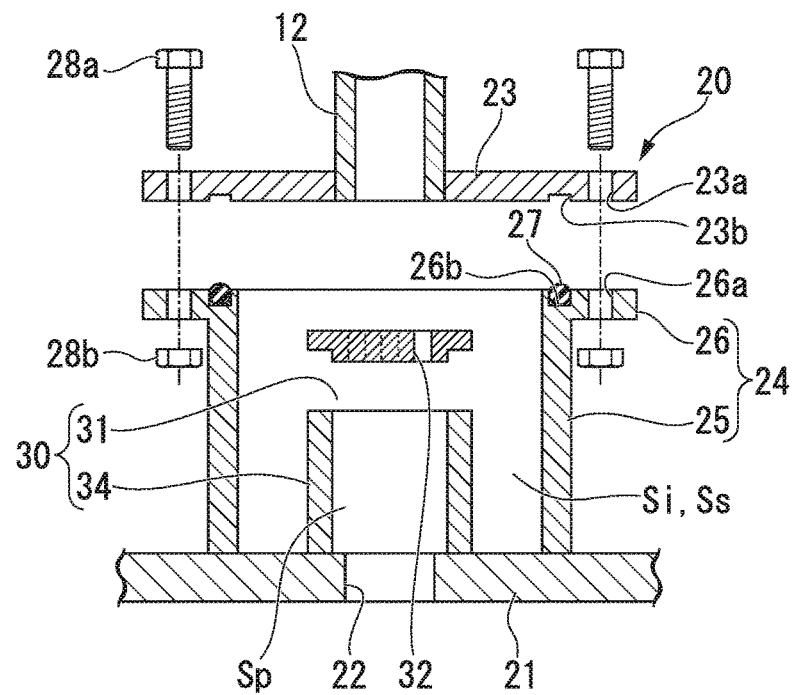
FIG. 5 is an exploded cross-sectional view of a relevant part of the device for reducing frictional resistance according to the first embodiment of the present invention.

A plurality of blowing holes 22 penetrating to the outside of the hull from the internal space Si are formed in the outer-wall plate 21 of the chamber 20. The plurality of blowing holes 22 are formed in different positions from each other in the height direction Dh of the hull B. The shapes and areas of the plurality of blowing holes 22 are the same in each blowing hole. A supply pipe 12 is connected to the supply-pipe-connecting plate 23 of the chamber 20. As shown in FIG. 5, in an outer periphery of the supply-pipe-connecting plate 23, a bolt-insertion hole 23a penetrating toward the outer-wall plate 21 and a seal groove 23b into which a seal member 27 fits are formed. The peripheral-wall plate 24 of the chamber 20 is formed of a peripheral wall 25 extending toward the outer-wall plate 21 from the supply-pipe-connecting plate 23 and a flange 26 protruding outward from an end of the peripheral wall 25 at the side of the supply-pipe-connecting plate 23 along the supply-pipe-connecting plate 23; and in the flange 26, a seal groove 26b is formed at a position facing the seal groove 23b of the supply-pipe-connecting plate 23 and a bolt-insertion hole 26a is formed at a position facing the bolt-insertion hole 23a of the supply-pipe-connecting plate 23. As shown in FIG. 4, the supply-pipe-connecting plate 23 is connected to the peripheral wall plate 24 by a bolt 28a inserted into the bolt-insertion hole 23a of the supply-pipe-connecting plate 23 and the bolt-insertion hole 26a of the peripheral-wall plate 24 and a nut 28b into which the bolt 28a is screwed. An end of the peripheral-wall plate 24 at the side of the outer-wall plate 21 in the peripheral wall 25 is joined to the outer-wall plate 21 by welding or the like.

As shown in FIG. 3, the device for reducing frictional resistance A of the present embodiment further includes a distributor 30 provided to each of the plurality of blowing holes 22 and guiding a part of an air, which is supplied into the chamber 20, to the blowing hole 22 from the supply pipe 12. As shown in FIGS. 4 and 5, the distributor 30 includes a cylinder 34 and a cover 31. One side of the cylinder 34 is joined to a portion on the outer-wall plate 21 and around one blowing hole 22. The other side of the cylinder 34 is connected to the cover 31 and an opening of the other side of the cylinder 34 is covered by the cover 31. A partial space Sp is formed by a space which is surrounded by the outer-wall plate 21 and the cylinder 34 and cover 31 of the distributor 30. Thus, the cylinder 34 and cover 31 of the distributor 30 form a partition member sectioning the internal space Si of the chamber 20 into a supply-pipe-side space Ss communicating with an opening of the supply pipe 12 and a partial space Sp of each of the plurality of blowing holes 22. At least one penetration hole 32 penetrating toward the partial space Sp from the supply-pipe-side space Ss is formed in the cover 31 of the distributor 30.

The number of the penetration hole 32 of each of the plurality of distributors 30 is different for each other, as shown in FIG. 3.

Specifically, the number of the penetration hole 32 of the distributor 30 corresponding to the blowing hole 22 placed at a position higher than the adjacent blowing hole is less than the number of the penetration hole 32 of the distributor 30 corresponding to the blowing hole 22 placed at a position lower than the adjacent blowing hole. An opening area of the penetration hole 32 is the same in each of the plurality of penetration holes 32. Thus, the flow amount of air flowing into the partial space Sp inside the distributor 30 from the supply-pipe-side space Ss via the penetration hole 32 is reduced at the distributor 30 corresponding to the blowing hole 22 placed at a position higher than the adjacent blowing hole more than at the distributor 30 corresponding to the blowing hole 22 placed at a position lower than the adjacent blowing hole. In other word, the higher the height position of the blowing hole 22 corresponding to the distributor 30 is, the more the plurality of distributors 30 reduces the flow amount of the air guided to the corresponding blowing hole 22. Thus, the penetration hole 32 of each of the plurality of distributors 30 works as a flow-amount adjuster adjusting the flow amount of the air guided to the blowing hole 22 corresponding to the distributor 30.

The air from the air-supply device 11 is supplied to the supply-pipe-side space Ss inside the chamber 20 via the supply pipe 12 (gas supplying step). The air supplied to the supply-pipe-side space Ss is guided to the blowing hole 22 corresponding to each distributor 30 by the plurality of distributors 30 and is blown out into the water outside of the hull from the blowing hole 22 (gas distributing step). As mentioned above, the higher the height position of the blowing hole 22 is, the more the flow amount of air guided to this blowing hole 22 is reduced. On the other hand, the lower the height position of the blowing hole 22 is, the higher water pressure this blowing hole 22 is subjected to from the outside of the hull, and the water resistance with respect to the air blown out from the blowing hole 22 into the water increases. Therefore, in the present embodiment, the flow amount of the air blown out from the plurality of blowing holes 22 placed at different heights from each other is equalized. In addition, in the present embodiment, since the shapes and areas of the opening of the plurality of blowing holes 22 are the same, the dispersion along the outer wall of the hull of the air blown out from the plurality of blowing holes 22 is equalized.

Accordingly, in the present embodiment, since the dispersion along the outer wall of the hull of the air blown out from the plurality of blowing holes 22 is equalized along with the flow amount of the air blown out from the plurality of blowing holes 22 being equalized, a distribution of the air along the outer wall of the hull can be equalized. Thus, in the present embodiment, the frictional resistance of the hull B can be reduced by more than in the prior art.

In addition, in the present embodiment, the peripheral plate 24 of the chamber 20 and the supply-pipe-connecting plate 23 are connected together by bolting. Thus, by removing the supply-pipe-connecting plate 23 from the peripheral-wall plate 24 after removing the bolt 28a, the chamber 20 is released. Accordingly, in the present invention, checking, repairing work and the like of the inside of the chamber 20 can be easily performed. In addition, when checking, repairing work and the like of the inside of the chamber 20 are not necessary or checking, repairing work and the like of the inside of the chamber 20 will not be performed for a long period, the peripheral plate 24 of the chamber 20 and the supply-pipe-connecting plate 23 can be connected together by welding. In addition, the connection between the cover and cylinder of the distributor can be connected by bolting similarly to the peripheral plate 24 of the chamber 20 and the supply-pipe-connecting plate 23.

Modification of First Embodiment

A modification of a first embodiment will be described with referring FIGS. 6 to 9.

Here, a case in which one penetration hole of the plurality of penetration holes is on an extension of the blowing hole in the penetration direction of the blowing hole in the outer-wall plate when the plurality of penetration holes are formed in the cover of the distributor, is considered. In this case, the air flown into the partial space Sp from the one penetration hole flows straight and the air is blown to the outside of the hull from the blowing hole without any change. Thus, in this case, the flow amount of the air blown from the blowing hole depends on the flow amount of the air flown into the partial space Sp from the one penetration hole, and a desired flow amount may not be achieved.

Thus, the modification described below has been devised so that the air flowing into the subspace Sp from the plurality of penetration holes is blown out from the blowing hole substantially uniformly.

Figure 6:
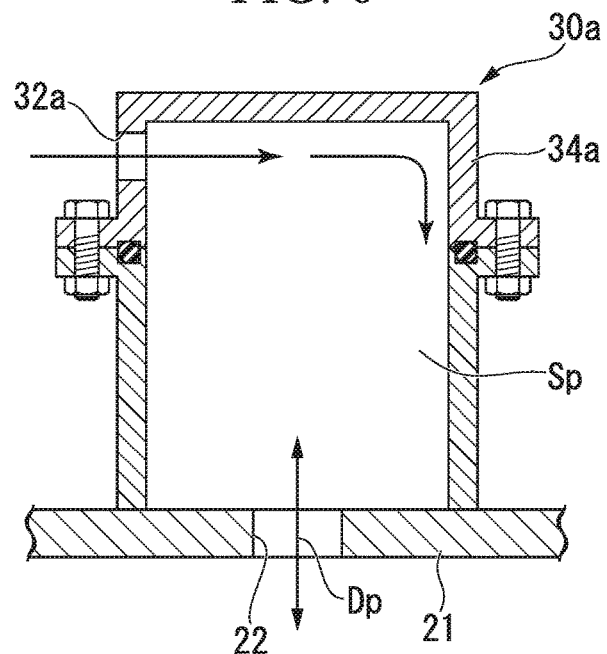
FIG. 6 is a cross-sectional view of a distributor according to a first modification of the first embodiment of the present invention.

In a distributor 30a in the first modification of the first embodiment, as shown in FIG. 6, a penetration hole 32a is formed in a cylinder 34a of the distributor 30a. Thus, the penetration direction of the penetration hole 32a formed in the cylinder 34a is different from the penetration direction Dp of the blowing hole 22 formed in the outer-wall plate 21, and the air flown into the partial space Sp from the penetration hole 32a does not flow into the blowing hole 22 by flowing straight.

Figure 7:
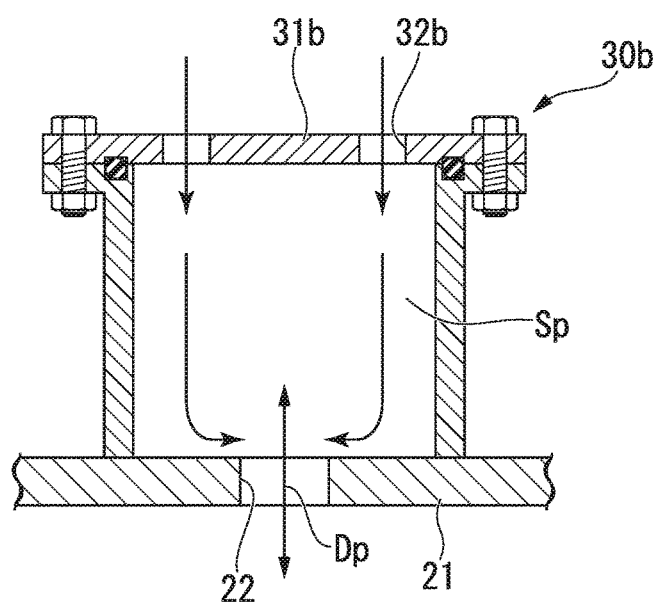
FIG. 7 is a cross-sectional view of a distributor according to a second modification of the first embodiment of the present invention.

In a distributor 30b in the second modification of the first embodiment, as shown in FIG. 7, a plurality of penetration holes 32b are formed in a cover 31b of the distributor 30b in the same manner as the distributor 30 of the aforementioned first embodiment. In this regard, however, in the present modification, a penetration hole 32b does not exist on an extension of the blowing hole 22 in the penetration direction Dp of the blowing hole 22. Thus, also in the present modification, the air flown into the partial space Sp from the penetration hole 32b does not flow into the blowing hole 22 by flowing straight.

Figure 8:
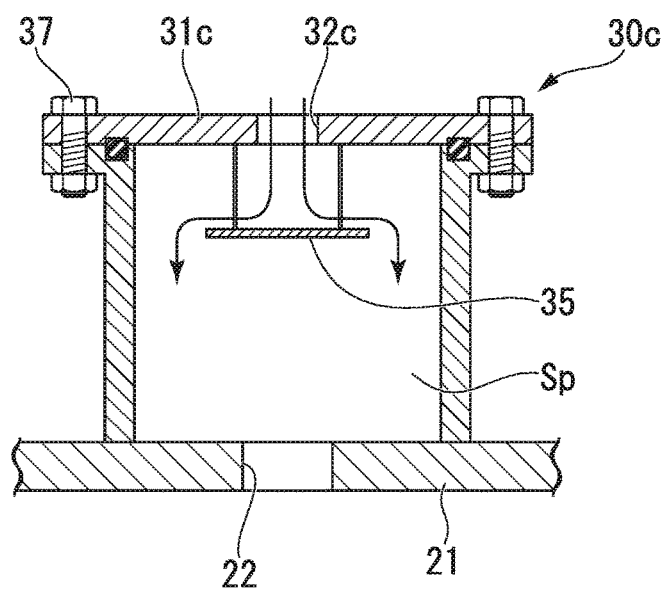
FIG. 8 is a cross-sectional view of a distributor according to a third modification of the first embodiment of the present invention.

In a distributor 30c in the third modification of the first embodiment, as shown in FIG. 8, a penetration hole 32c is formed in a cover 31c of the distributor 30c in the same manner as the distributor 30 of the aforementioned first embodiment. In this regard, however, in the present modification, a baffle plate (a change-direction member) 35 changing the direction of the air flown into the partial space Sp from the penetration hole 32c is provided between the penetration hole 32c and the blowing hole 22. Thus, also in the present modification, the air flown into the partial space Sp from the penetration hole 32c does not flow into the blowing hole 22 by flowing straight.

Figure 9:
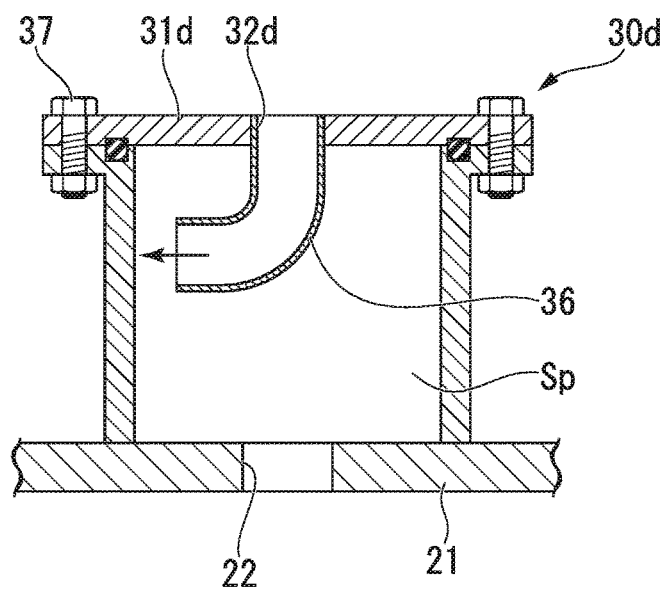
FIG. 9 is a cross-sectional view of a distributor according to a fourth modification of the first embodiment of the present invention.

In a distributor 30d in the fourth modification of the first embodiment, as shown in FIG. 9, a penetration holes 32d are formed in a cover 31d of the distributor 30d in the same manner as the distributor 30 of the aforementioned first embodiment. In this regard, however, in the present modification, a bending pipe (a change-direction member) 36 is connected to the partial space Sp side of the penetration hole 32d. Thus, also in the present modification, the air flown into the partial space Sp from the penetration hole 32d does not flow into the blowing hole 22 by flowing straight.

In addition, as shown in the third modification and fourth modification, when the member is disposed in the partial space Sp, in terms of installation, repairing work, checking, and the like of the member, as shown in FIGS. 8 and 9, it is preferable that the cover and cylinder of the distributor are connected by the bolt 37 so that the cover can be separated from the cylinder easily.

Second Embodiment

In a ship of the present embodiment, the distributor 30 only in the ship of the first embodiment is different therefrom, and the other structures are the same as in the first embodiment. Also, in the embodiments and modifications described hereinafter, the distributor 30 only in the ship of the first embodiment is different therefrom, and the other structures are the same as in the first embodiment. Thus, in the description hereinafter, the distributor is mainly explained.

Figure 10:
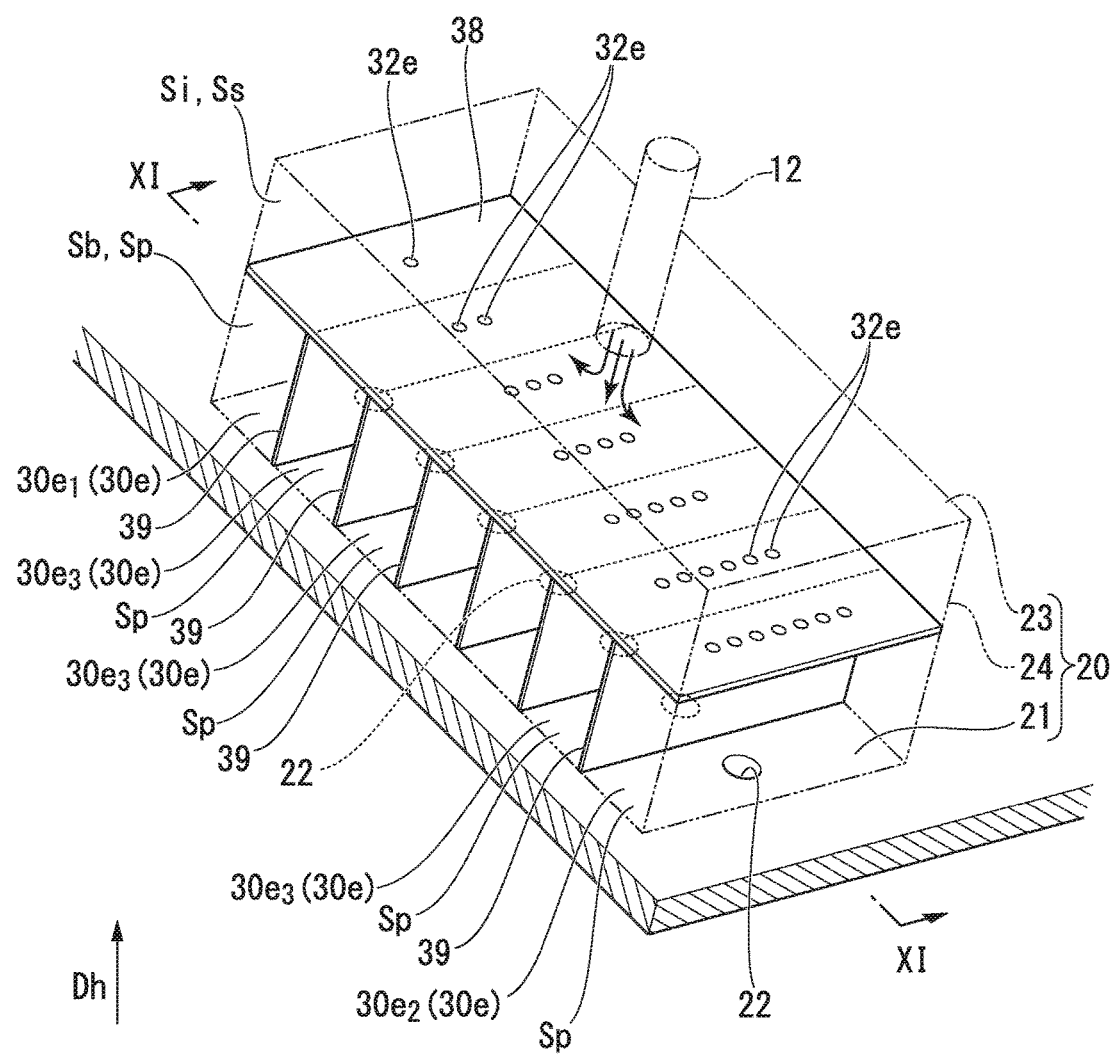
FIG. 10 is a perspective view of a relevant part of a device for reducing frictional resistance according to a second embodiment of the present invention.
Figure 11:
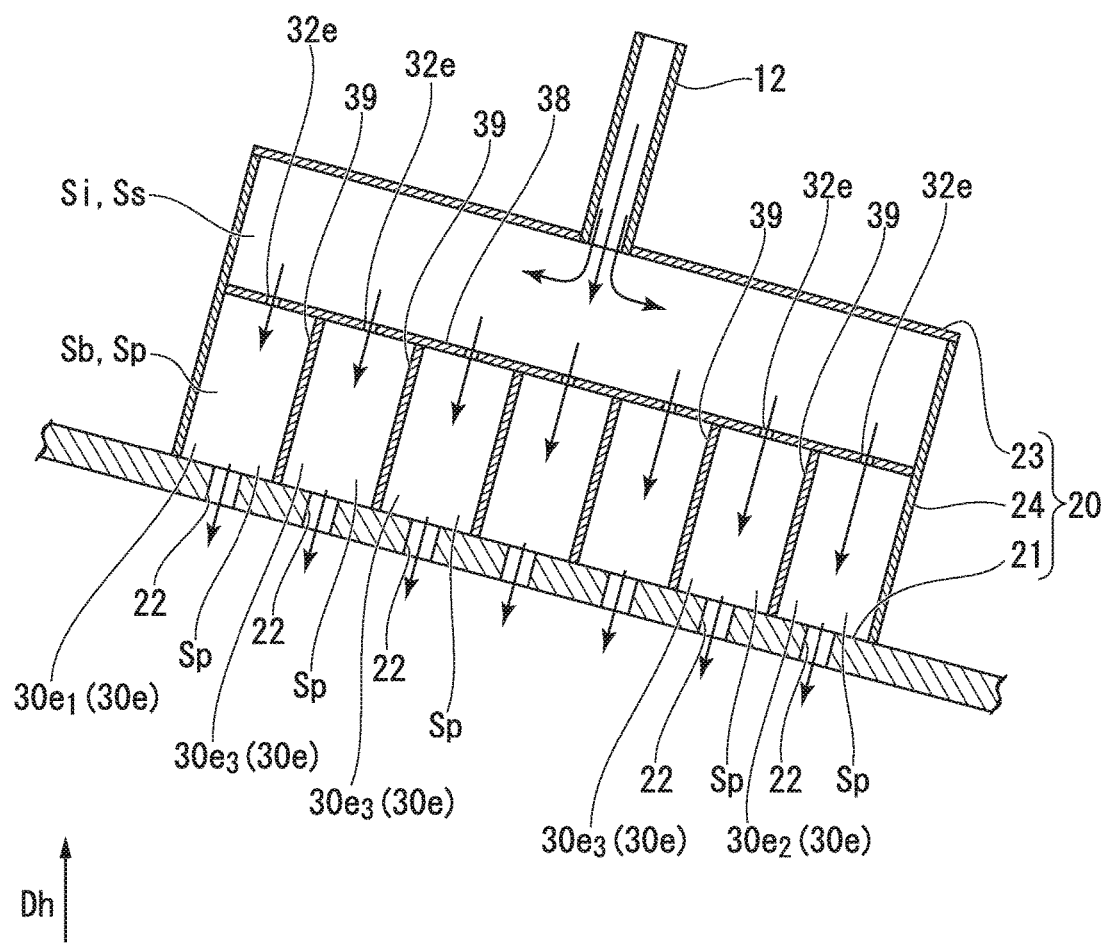
FIG. 11 is a cross-sectional view of the XI-XI line in FIG. 10.

A plurality of distributors 30e of the present embodiment, as shown in FIGS. 10 and 11, includes an internal-space-partition plate 38 sectioning the internal space Si of the chamber 20 into a blowing-side space Sb at the outer-wall plate 21 side and the supply-pipe-side space Ss at the supply-pipe-connecting plate 23 side, and a plurality of blowing-side-partition plates 39 dividing the blowing-side space Sb into a plurality of partial spaces Sp by sectioning the blowing-side space Sb with respect to each blowing hole 22. Thus, the internal-space-partition plate 38 and the plurality of blowing-side-partition plates 39 included in the plurality of distributors 30e are formed as a partition member sectioning the internal space Si of the chamber 20 into the supply-pipe-side space Ss communicating to the opening of the supply pipe 12 and the partial space Sp of each of the plurality of blowing holes 22.

Of the plurality of distributors 30e, with respect to the distributors 30e1, 30e2 of both ends, that is, with respect to the distributor 30e1 which corresponds to the blowing hole 22 placed at the highest position and the distributor 30e2 which corresponds to the blowing hole 22 placed at the lowest position, the internal space Si is sectioned by part of the peripheral-wall plate 24 of the chamber 20, part of the internal-space-partition plate 38, and one blowing-side-partition plate 39. Also, of the plurality of distributors 30e, with respect to the distributors 30e3 other than the distributors 30e1, 30e2 of both ends, the internal space Si is sectioned by part of the peripheral-wall plate 24 of the chamber 20, part of the internal-space-partition plate 38, and two blowing-side-partition plates 39 adjacent to each other.

Figure 12:
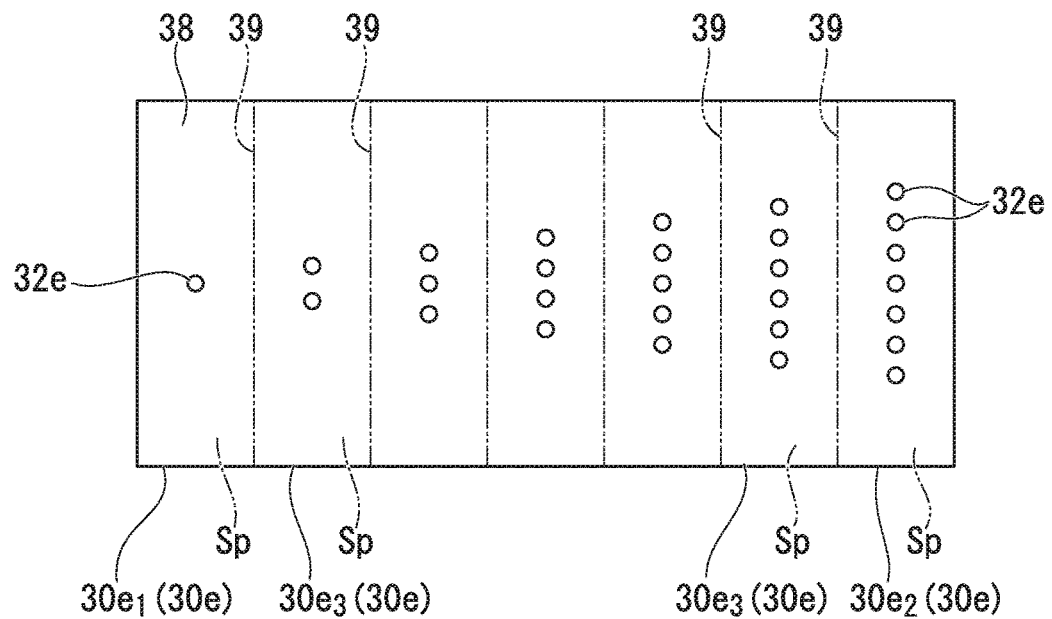
FIG. 12 is a plan view of an internal-space-partition plate according to the second embodiment of the present invention.

In the internal-space-partition plate 38, at least one penetration hole 32e penetrating toward the partial space Sp from the supply-pipe-side space Ss is formed in each of the plurality of partial spaces Sp. As shown in FIGS. 10 and 12, the number of the penetration hole 32e of each of the plurality of distributors 30e is different for each of the distributors in the same manner as the first embodiment. Specifically, the number of the penetration hole 32e of the distributor 30e corresponding to the blowing hole 22 placed in a position higher than the adjacent blowing hole is less than the number of the penetration hole 32e of the distributor 30e corresponding to the blowing hole 22 placed in a position lower than the adjacent blowing hole. An opening area of the penetration hole 32e is the same in each of the plurality of penetration holes 32e. Thus, also in the present embodiment, the higher the height position of the blowing hole 22 corresponding to the distributor 30e is, the more the plurality of distributors 30e reduces the flow amount of the air guiding to the corresponding blowing hole 22. Thus, the penetration hole 32e of each of the plurality of distributors 30e works as a flow-amount adjuster adjusting the flow amount of the air guided to the blowing hole 22 corresponding to the distributor 30e.

According to the above, the present embodiment is different from the first embodiment in terms of the structure of the partition member sectioning the internal space Si of the chamber 20 into the supply-pipe-side space Ss and the plurality of partial spaces Sp. However, the flow-amount adjuster of each of the plurality of distributors 30e is the same as in the first embodiment.

Also in the present embodiment, the flow amount of the air blown out from the plurality of blowing holes 22 different in height to each other can be equalized in the same manner as the first embodiment. In addition, also in the present embodiment, since the shapes and areas of the opening of the plurality of blowing holes 22 are the same, the dispersion along the outer wall of the hull of the air blown out from the plurality of blowing holes 22 is equalized. Thus, also in the present embodiment, in the same manner as the first embodiment, a distribution of the air along the outer wall of the hull can be equalized, and the frictional resistance of the hull B can be further reduced.

First Modification of Second Embodiment

Figure 13:
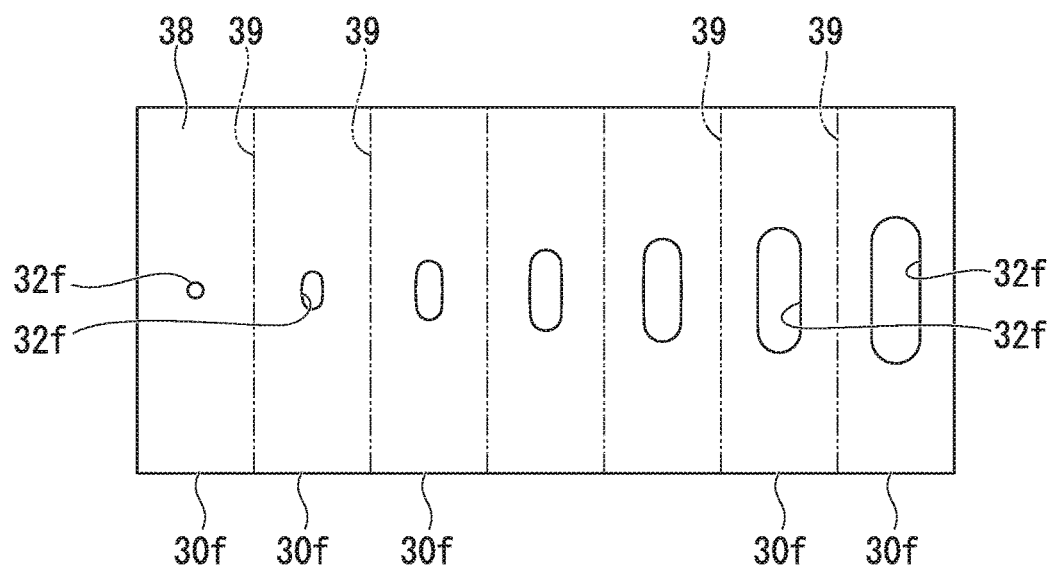
FIG. 13 is a plan view of an internal-space-partition plate according to a first modification of the second embodiment of the present invention.

First modification of the second embodiment is explained by using FIG. 13. Each modification of the second embodiment explained hereinafter is different in the flow-amount adjuster in the distributor 30e of the second embodiment.

In the second embodiment, the number of the penetration holes 32e of each of the plurality of distributors 30e is different for each of the distributors 30e. In the present modification, the number of penetration holes 32f of each of a plurality of distributors 30f is the same in each of the distributors 30f, but an opening area of the penetration hole 32f of each of a plurality of distributors 30f is different for each of the distributors 30f. Specifically, the opening area of the penetration hole 32f of the distributor 30f corresponding to the blowing hole 22 placed at a position higher than the adjacent blowing hole is smaller than the opening area of the penetration hole 32f of the distributor 30f corresponding to the blowing hole 22 placed at a position lower than the adjacent blowing hole. Thus, with respect to the plurality of distributors 30f, the more a height position of the blowing hole 22 corresponding to the distributor 30f is high, the more a flow amount of air guided to the corresponding blowing hole 22 is small. Therefore, in the present modification, the penetration hole 32f of each of the plurality of distributors 30f works as a flow-amount adjuster adjusting the flow amount of air guided to the blowing hole 22 corresponding to the distributor 30f.

Therefore, also in the present modification, the flow amount of the air blowing from each of the blowing holes can be equalized, and the frictional resistance of the hull B can be reduced in the same manner as in each of the aforementioned embodiments and modifications.

Second Modification of Second Embodiment

Figure 14:
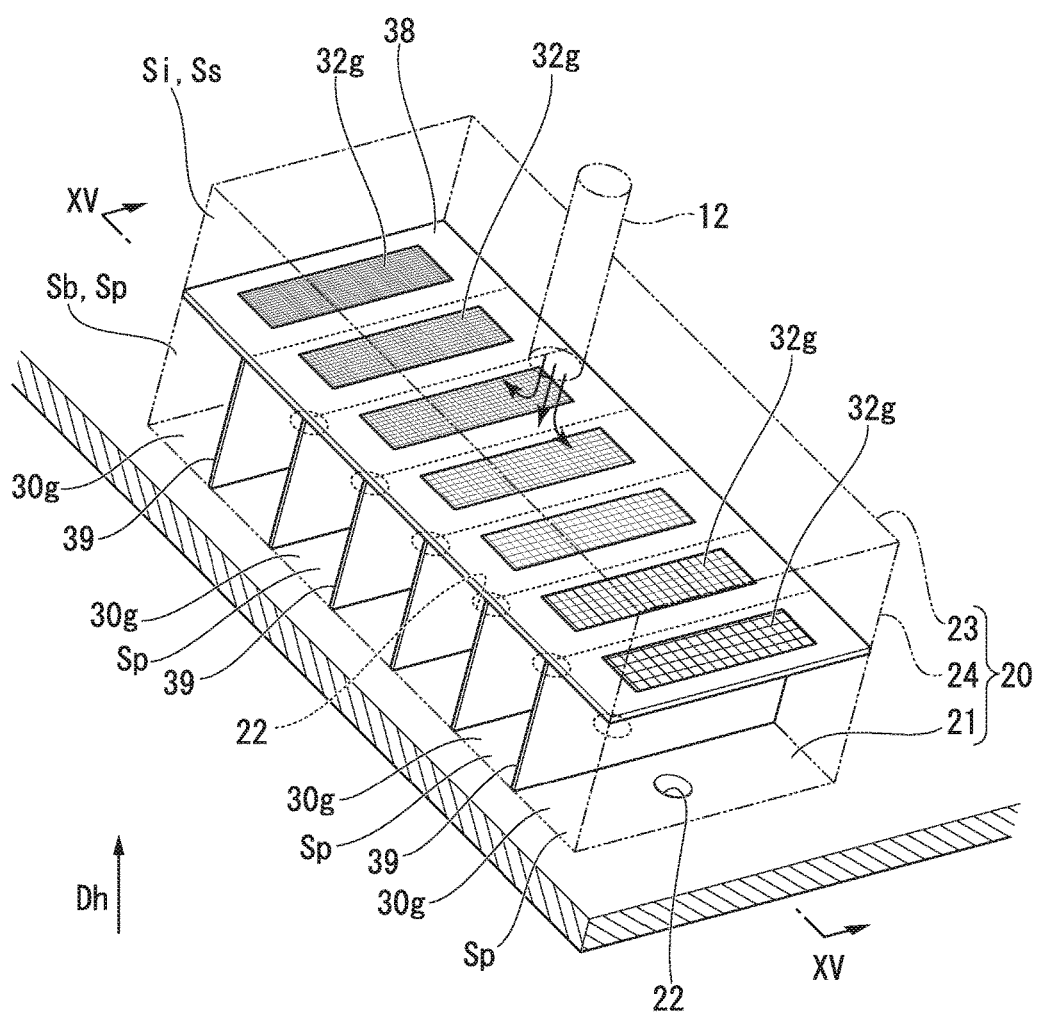
FIG. 14 is a perspective view of a relevant part of a device for reducing frictional resistance according to a second modification of the second embodiment of the present invention.
Figure 15:
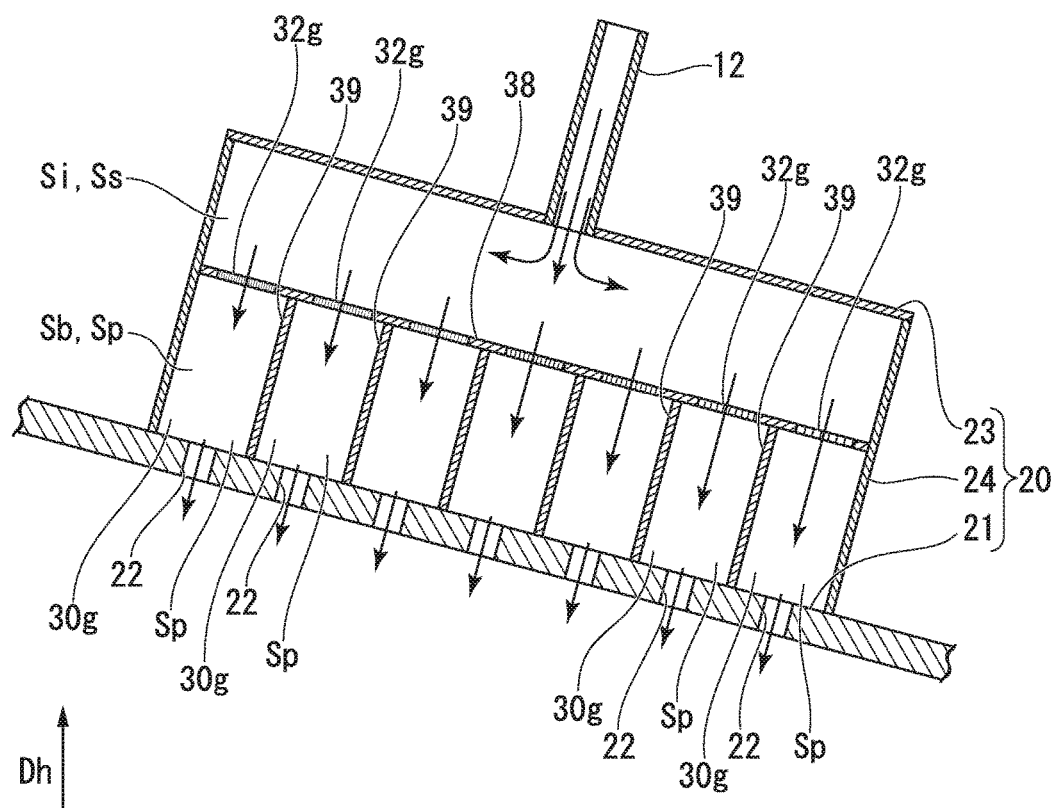
FIG. 15 is a cross-sectional view of the XV-XV line in FIG. 14.
Figure 16:
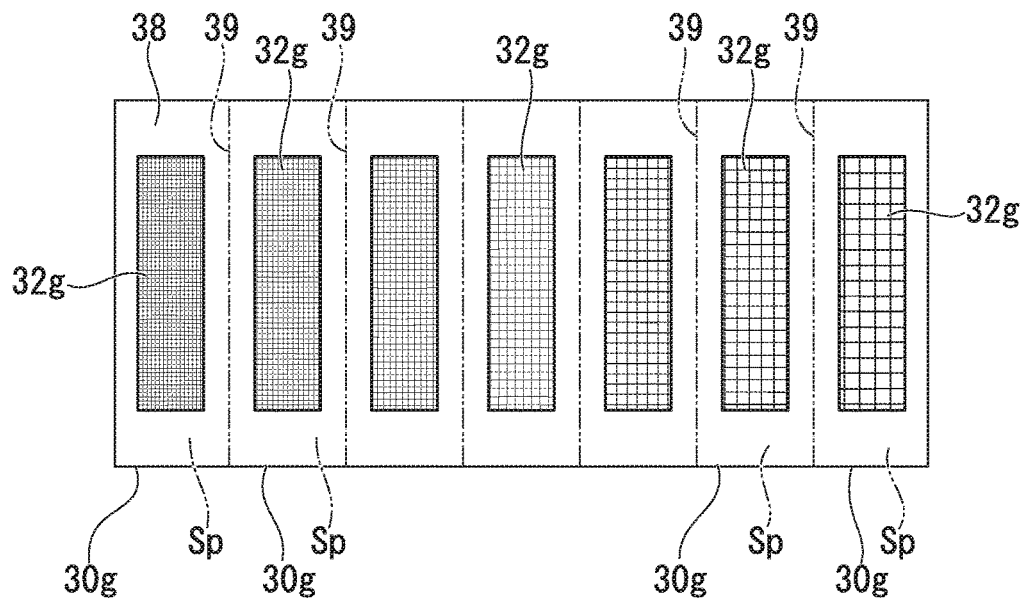
FIG. 16 is a plan view of an internal-space-partition plate according to the second modification of the second embodiment of the present invention.

A second modification of the second embodiment will be explained using FIGS. 14 to 16.

In the internal-space-partition plate 38 of the present modification, an opening is formed in each of the plurality of partial spaces Sp.

In the present modification, a screen 32g is provided on each opening of the internal-space-partition plate 38. That is, a screen 32g guiding the air of the supply-pipe-side space Ss into the partial space Sp of the relevant distributor is provided on each of a plurality of distributors 30g. A size of openings of the screen 32g of each of the plurality of distributors 30g is different for each of the distributors 30g. Specifically, the size of openings of the screen 32g of the distributor 30g corresponding to the blowing hole 22 placed at a position higher than the adjacent blowing hole is smaller than the size of openings of the screen 32g of the distributor 30g corresponding to the blowing hole 22 placed at a position lower than the adjacent blowing hole. Thus, with respect to the plurality of distributors 30g, the higher a height position of the blowing hole 22 corresponding to the distributor 30g is, the more the flow amount of air guided to the corresponding blowing hole 22 is reduced. Therefore, in the present modification, the screen 32g of each of the plurality of distributors 30g works as a flow-amount adjuster adjusting the flow amount of air guided to the blowing hole 22 corresponding to the distributor 30g.

Therefore, also in the present modification, the flow amount of the air blowing from each of the blowing holes can be equalized, and the frictional resistance of the hull B can be reduced in the same manner as in each of the aforementioned embodiments and modifications.

Third Modification of Second Embodiment

Figure 17:
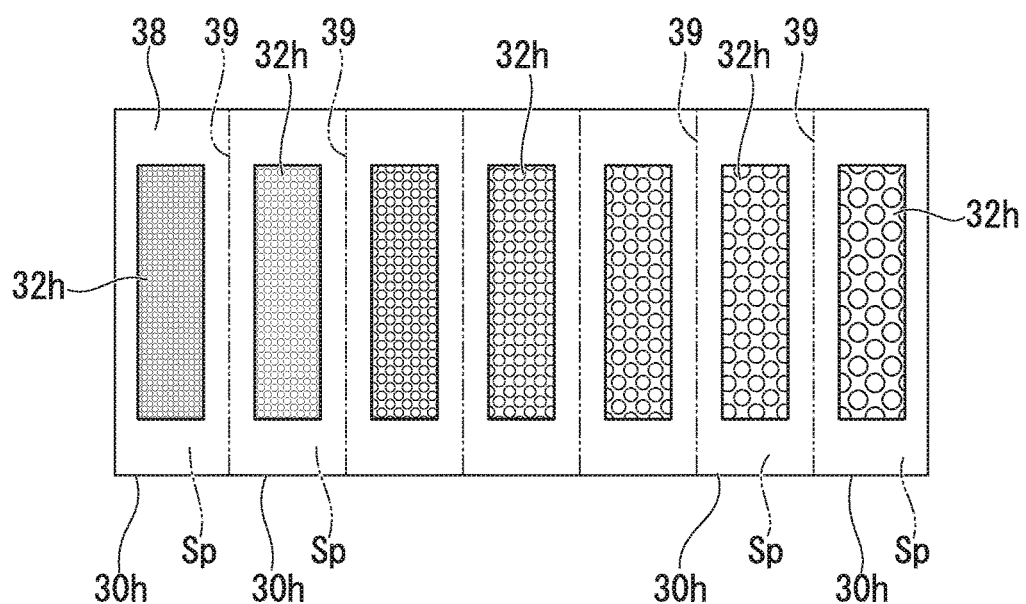
FIG. 17 is a plan view of an internal-space-partition plate according to a third modification of the second embodiment of the present invention.

A third modification of the second embodiment will be explained using FIG. 17.

In the present modification, a perforated plate 32h is provided instead of the screen 32g of the second modification of the second embodiment. That is, in the present modification, the perforated plate 32h guiding the air of the supply-pipe-side space Ss into the partial space Sp of the relevant distributor is provided on each of a plurality of distributors 30h. An opening area of one penetration hole 32e in the perforated plate 32h of each of the plurality of distributors 30h is different for each of the distributors 30h. Specifically, the opening area of one penetration hole 32e of the distributor 30h corresponding to the blowing hole placed at a position higher than the adjacent blowing hole is smaller than the opening area of the penetration hole 32e of the distributor 30h corresponding to the blowing hole placed at a position lower than the adjacent blowing hole. Thus, with respect to the plurality of distributors 30h, the higher the height position of the blowing hole corresponding to the distributor 30h is, the more the flow amount of air guided to the corresponding blowing hole is reduced. Therefore, in the present modification, the perforated plate 32h of each of the plurality of distributors 30h works as a flow-amount adjuster adjusting the flow amount of air guided to the blowing hole corresponding to the distributor 30h.

Therefore, also in the present modification, the flow amount of the air blowing from each of the blowing holes can be equalized, and frictional resistance of the hull B can be reduced in the same manner as in each of the aforementioned embodiments and modifications.

Fourth Modification of Second Embodiment

Figure 18:
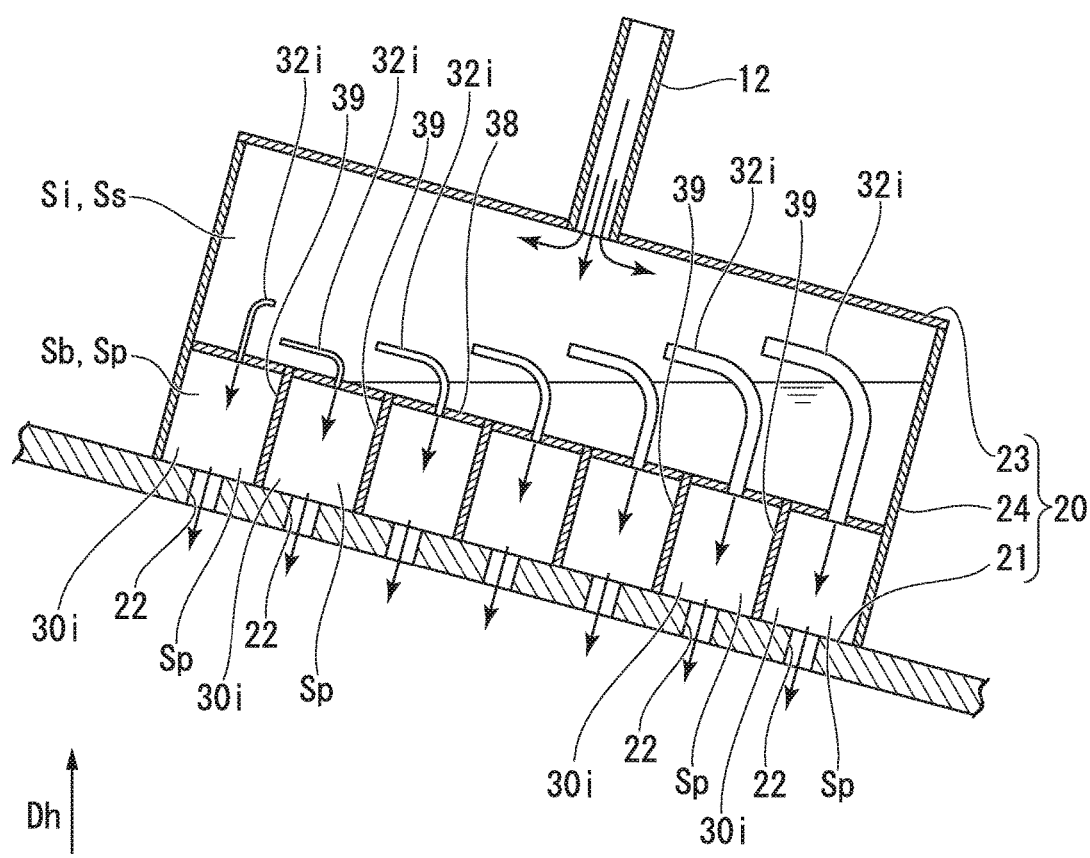
FIG. 18 is a cross-sectional view of a relevant part of a device for reducing frictional resistance according to a fourth modification of the second embodiment of the present invention.

A fourth modification of the second embodiment will be explained using FIG. 18.

In the internal-space-partition plate 38 of the present modification, a pipe 32i is provided in each of the plurality of partial spaces Sp. That is, in the present modification, the pipe 32i guiding the air of the supply-pipe-side space Ss into the partial space Sp of the relevant distributor is provided on each of a plurality of distributors 30i. On each of the distributors 30i, one pipe 32i is provided. The inner diameter (or the opening area) of the pipe 32i of each of the plurality of distributors 30i is different for each of the distributors 30i. Specifically, the inner diameter (or the opening area) of the pipe 32i of the distributor 30i corresponding to the blowing hole 22 placed at a position higher than the adjacent blowing hole is smaller than the inner diameter (or the opening area) of the pipe 32i of the distributor 30h corresponding to the blowing hole placed at a position lower than the adjacent blowing hole. Thus, with respect to the plurality of distributors 30i, the higher the height position of the blowing hole 22 corresponding to the distributor 30i is, the more the flow amount of air guided to the corresponding blowing hole 22 is reduced. Therefore, in the present modification, the pipe 32i of each of the plurality of distributors 30g works as a flow-amount adjuster adjusting the flow amount of air guided to the blowing hole 22 corresponding to the distributor 30i.

Therefore, also in the present modification, the flow amount of the air blowing from each of the blowing holes can be equalized, and the frictional resistance of the hull B can be reduced in the same manner as in each of the aforementioned embodiments and modifications.

In the supply-pipe-side space Ss of the chamber 20, a case in which water accumulates can be assumed. If and when water accumulates in the supply-pipe-side space Ss, water accumulates in a part of the partial space Sp located below the supply-pipe-side space Ss and the water cannot drain from the blowing hole 22, the air will be not able to be blown out from the blowing hole 22. In the present modification, even though water accumulates in the supply-pipe-side space Ss except for the case where an inlet port of the pipe 32i of each of the distributors 30i is not submerged, the air of the supply-pipe-side space Ss can be guided to each partial space Sp.

Fifth Modification of Second Embodiment

Figure 19:
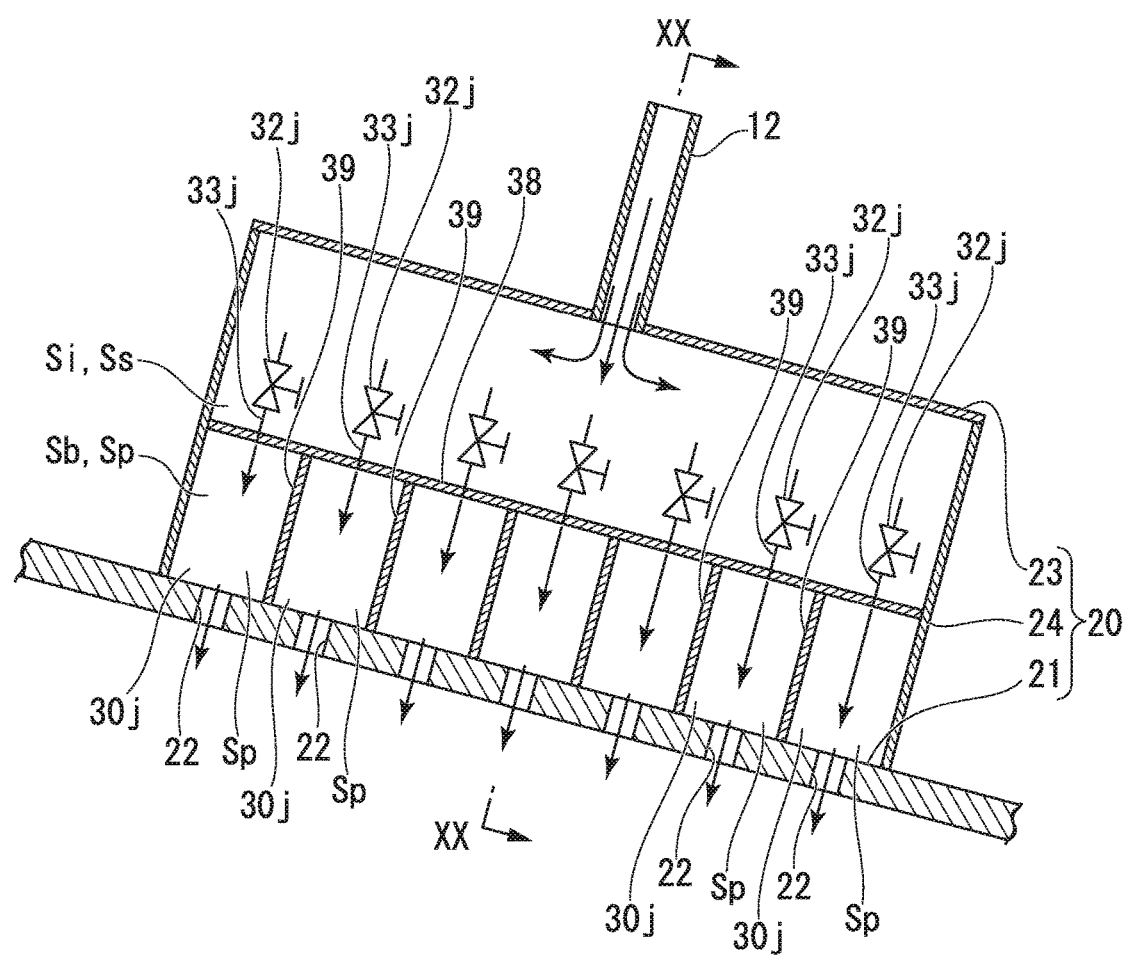
FIG. 19 is a cross-sectional view of a relevant part of a device for reducing frictional resistance according to a fifth modification of the second embodiment of the present invention.
Figure 20:
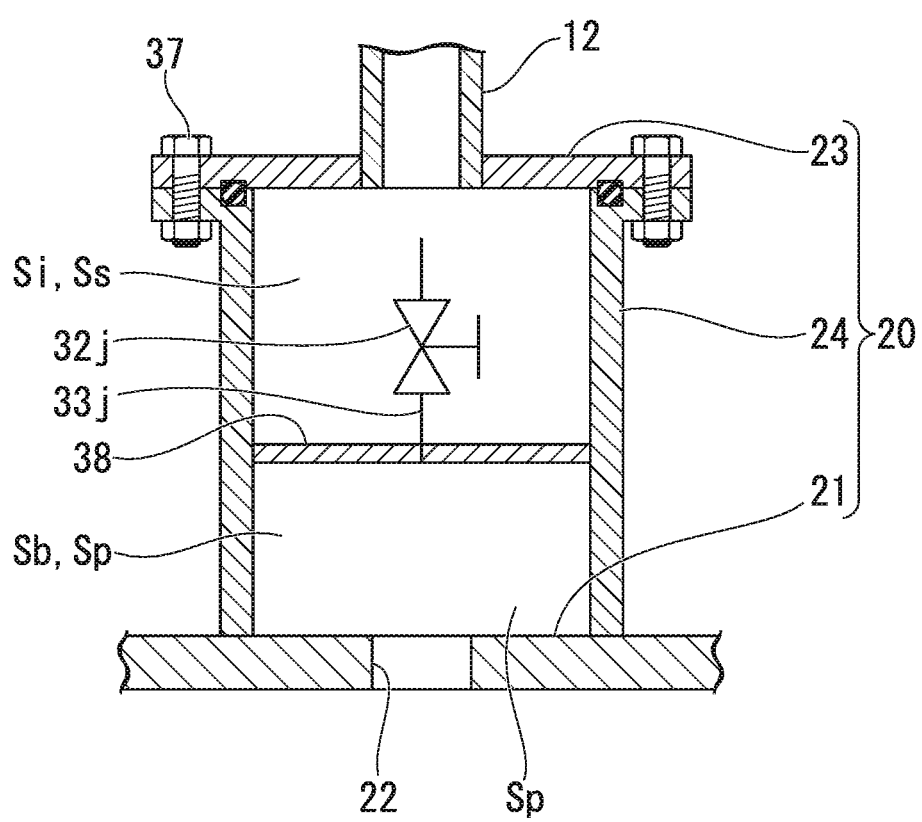
FIG. 20 is a cross-sectional view of the XX-XX line in FIG. 19.

A fifth modification of the second embodiment will be explained using FIGS. 19 and 20.

In the internal-space-partition plate 38 of the present modification, a pipe 33j and a valve 32j are provided to each of the plurality of partial spaces Sp. That is, in the present modification, the pipe 33j and the valve 32j which guide the air of the supply-pipe-side space Ss into the partial space Sp of the relevant distributor is provided on each of a plurality of distributors 30j.

On each distributor 30j, one pipe 33j is provided. On one pipe 33j, one valve 32j is provided. A valve opening position of the valve 32j of each of the plurality of distributors 30j is different for each of the distributors 30j. Specifically, the valve opening position of the valve 32j of the distributor 30j corresponding to the blowing hole 22 placed at a position higher than the adjacent blowing hole is smaller than the valve opening position of the valve 32j of the distributor 30j corresponding to the blowing hole 22 placed at a position lower than the adjacent blowing hole. Thus, with respect to the plurality of distributors 30j, the higher the height position of the blowing hole 22 corresponding to the distributor 30j is, the more the flow amount of air guided to the corresponding blowing hole 22 is reduced. Therefore, in the present modification, the valve 32j of each of the plurality of distributors 30j works as a flow-amount adjuster adjusting the flow amount of air guided to the blowing hole 22 corresponding to the distributor 30j.

Therefore, also in the present modification, the flow amount of the air blowing from each of the blowing holes can be equalized, and the frictional resistance of the hull B can be reduced in the same manner as in each of the aforementioned embodiments and modifications.

In addition, in the present modification, since the pipe 33j and the valve 32j are provided to the supply-pipe-side space Ss, even though water accumulates in the supply-pipe-side space Ss except for the case where an inlet port of the pipe 33i or the valve 32j of each of the distributors 30i is not submerged, the air of the supply-pipe-side space Ss can be guided to each partial space Sp.

Third Embodiment

A distributor of a third embodiment will be explained using FIGS. 21 to 24.

Figure 21:
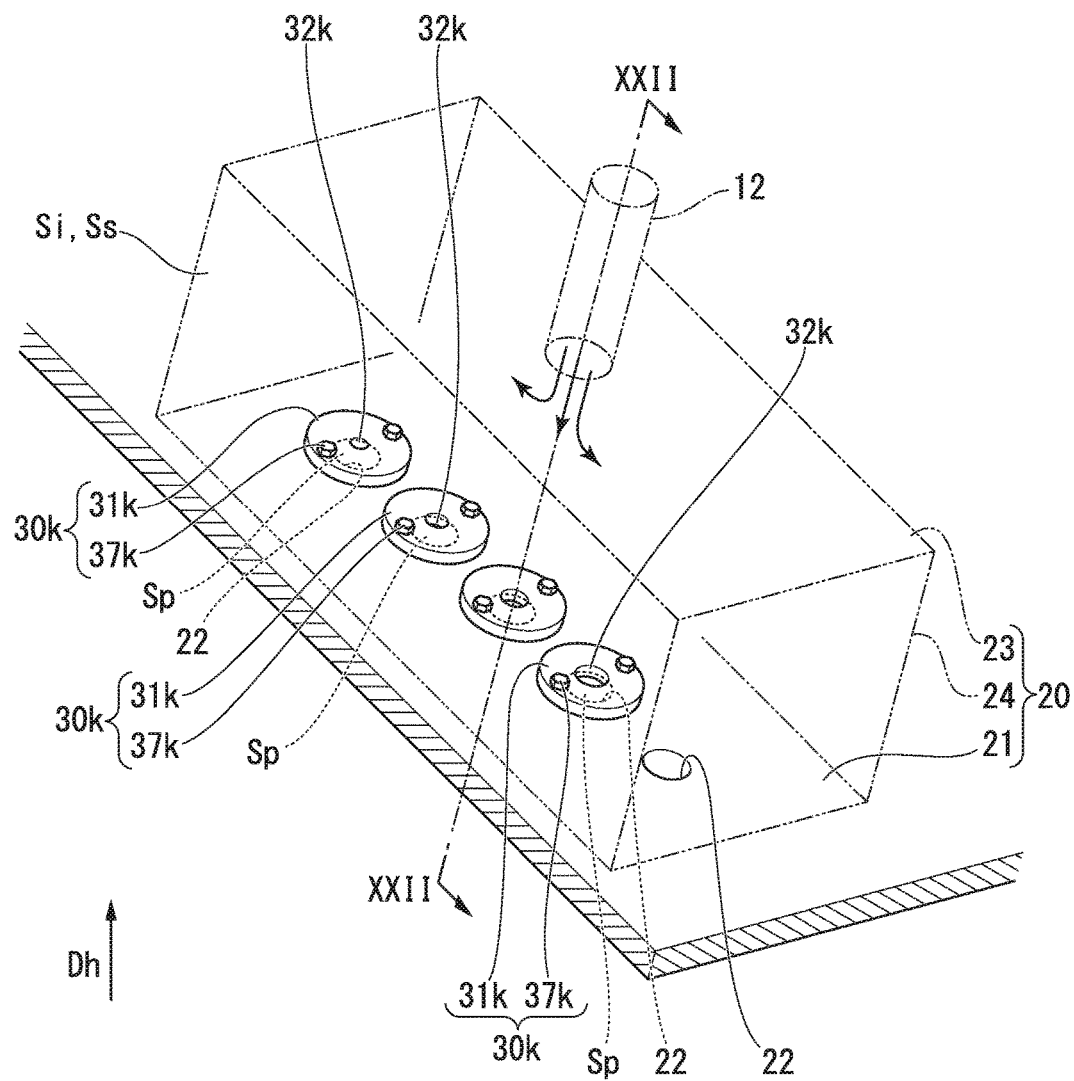
FIG. 21 is a perspective view of a relevant part of a device for reducing frictional resistance according to a third embodiment of the present invention.
Figure 22:
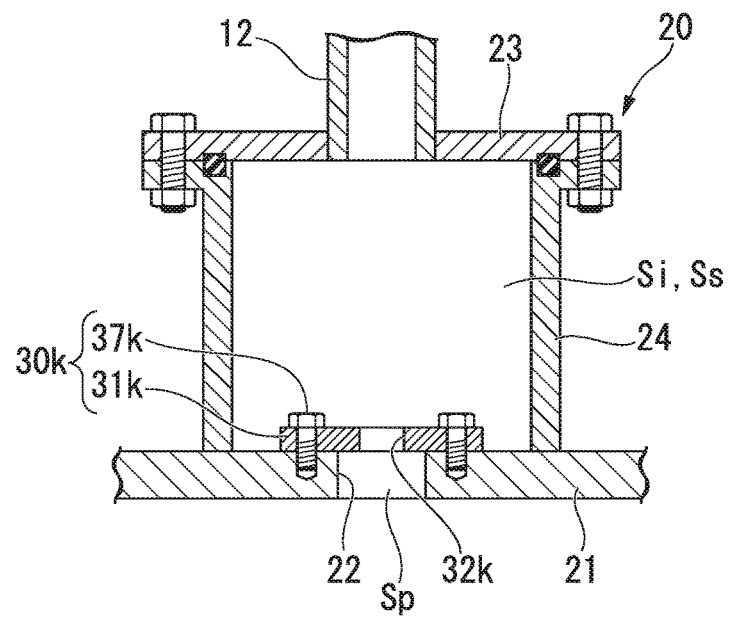
FIG. 22 is a cross-sectional view of the XXII-XXII line in FIG. 21.
Figure 23:
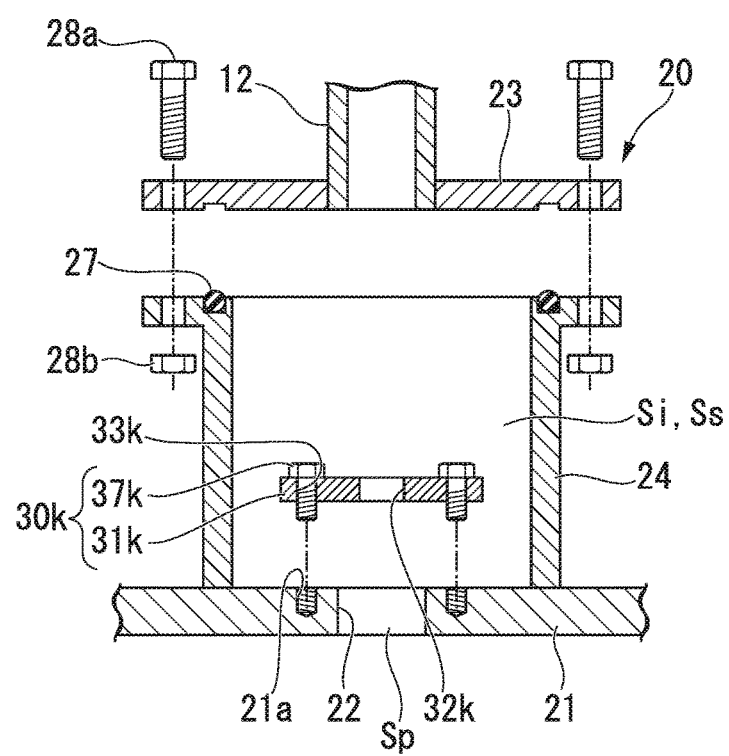
FIG. 23 is an exploded cross-sectional view of a relevant part of the device for reducing frictional resistance according to the third embodiment of the present invention.
Figure 24:
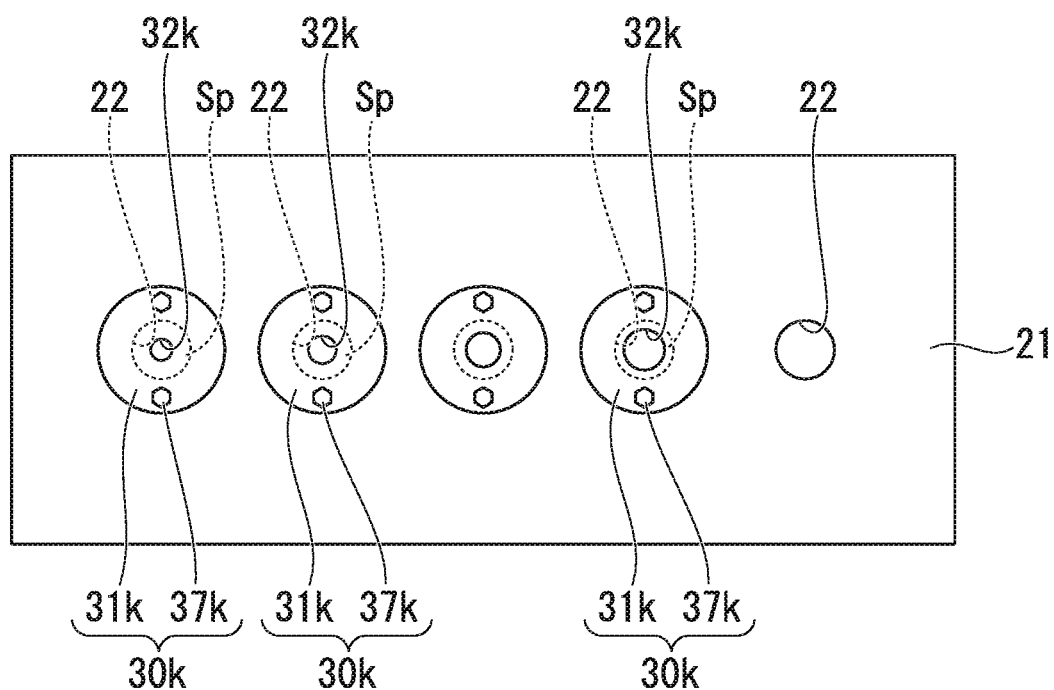
FIG. 24 is a plan view of a plurality of distributors according to the third embodiment of the present invention.

A plurality of distributors 30k of the present embodiment, as shown in FIGS. 21 to 23, includes a facing plate 31k facing the blowing hole 22 corresponding to the distributor 30k and facing a portion around the blowing hole 22 in the outer-wall plate 21, and a bolt 37k fixing the facing plate 31k to the outer-wall plate 21 so that the facing plate 31k is made to contact the outer-wall plate 21. The bolt 37k is inserted into a bolt hole 33k of the facing plate 31k and is screwed into a screw hole 21a formed in the outer-wall plate 21. The facing plate 31k forms a partition member sectioning the internal space Si to the partial space Sp including a space in the blowing hole 22 and the supply-pipe-side space Ss. In this facing plate 31k, a penetration hole 32k penetrating from the supply-pipe-side space Ss side to the partial space Sp is formed.

In the present embodiment, as shown in FIGS. 21 to 24, the number of penetration holes 32k of each of a plurality of distributors 30k is the same in each of the distributors 30k, but the opening area of the penetration hole 32k of each of a plurality of distributors 30k is different for each of the distributors 30k. Specifically, the opening area of the penetration hole 32k of the distributor 30k corresponding to the blowing hole 22 placed at a position higher than the adjacent blowing hole is smaller than the opening area of the penetration hole 32k of the distributor 30k corresponding to the blowing hole 22 placed at a position lower than the adjacent blowing hole. Therefore, also in the present embodiment, the penetration hole 32k of each of the plurality of distributors 30k works as a flow-amount adjuster adjusting the flow amount of air guided to the blowing hole 22 corresponding to the distributor 30k.

Therefore, also in the present embodiment, the flow amount of the air blowing from each of the blowing holes can be equalized, and the frictional resistance of the hull B can be reduced in the same manner as in each of the aforementioned embodiments and modifications.

In addition, in the present embodiment, the distributor 30k is configured by the facing plate 31k and the bolts 37, and since the structure of the distributor 30k is simple, the production cost of the distributor 30k can be reduced.

In addition, in the present embodiment, the distributor 30k is not provided to the blowing hole 22 placed at the lowest height position; however, the distributor 30k can be provided to the blowing hole 22 placed at the lowest height position. Also, in the present embodiment, a baffle plate as shown in FIG. 8 can be disposed inside the partial space Sp which is a space in the blowing hole 22.

Fourth Embodiment

Figure 25:
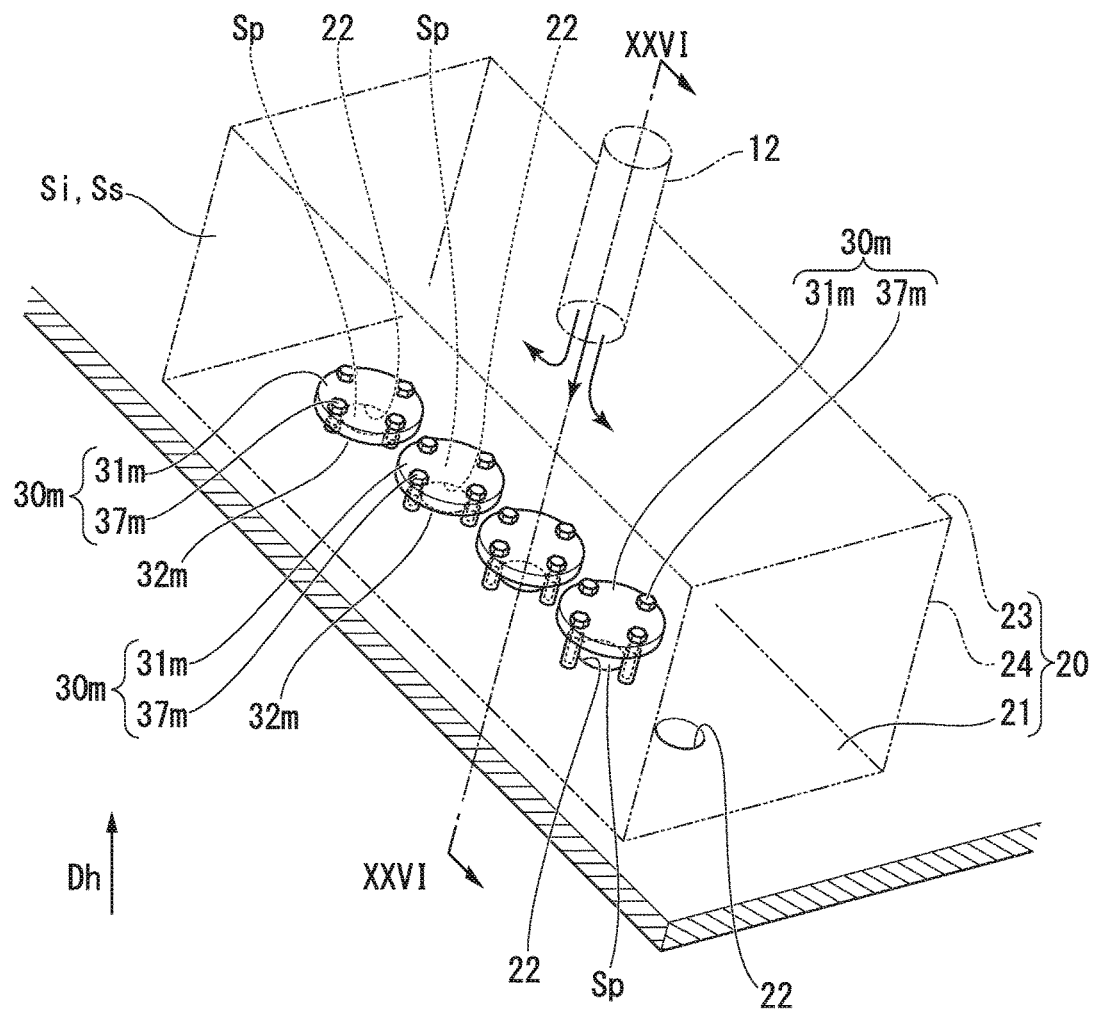
FIG. 25 is a perspective view of a relevant part of a device for reducing frictional resistance according to a fourth embodiment of the present invention.
Figure 26:
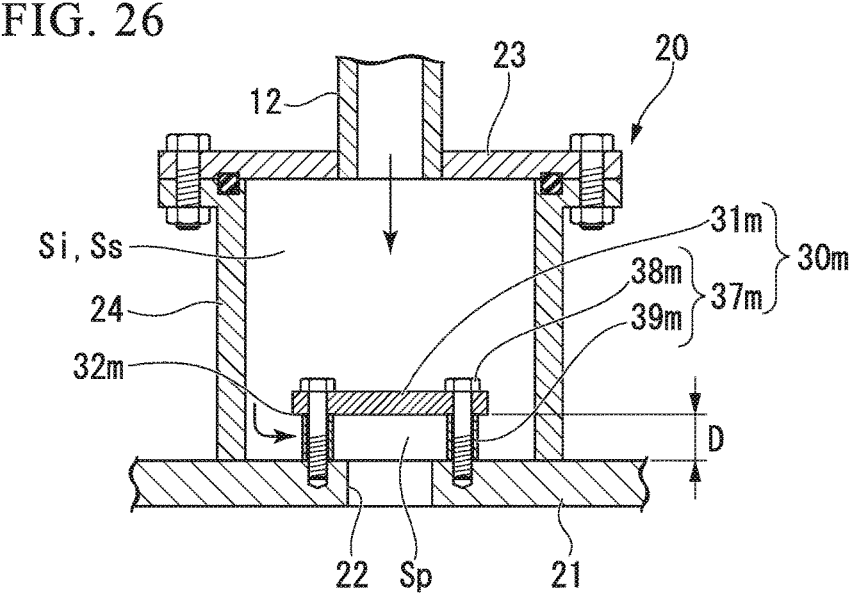
FIG. 26 is a cross-sectional view of the XXVI-XXVI line in FIG. 25.

A distributor of a fourth embodiment will be explained using FIGS. 25 to 26.

A plurality of distributors 30m of the present embodiment includes a facing plate 31m facing the blowing hole 22 corresponding to the distributor 30m and a portion around the blowing hole 22 in the outer-wall plate 21 with a clearance D, and a clearance-maintaining member 37m maintaining the clearance D between the facing plate 31m and the outer-wall plate 21. The clearance-maintaining member 37m includes a bolt 38m penetrating the facing plate 31m and screwing into the outer-wall plate 21 and a spacer 39m into which a bolt shank of the bolt 38m is inserted and which maintains the clearance D between the facing plate 31m inserted and the outer-wall plate 21. In this distributor 30m, the partial space Sp is formed by a space combined by a space sandwiched between the facing plate 31m and the outer-wall plate 21 and a space in the blowing hole 22. Also, in this distributor 30m, an opening 32m between an outer circumferential edge of the facing plate 31m and the outer-wall plate 21 is an opening into which the air flows from the supply-pipe-side space Ss side to the partial space Sp.

In the present embodiment, the clearance D between the facing plate 31m and the outer-wall plate 21 is different for each of the distributors 30m. Specifically, the size of the clearance D between the facing plate 31m of the distributor 30m corresponding to the blowing hole 22 placed at a position higher than the adjacent blowing hole and the outer-wall plate 21 is smaller than the size of the clearance D between the facing plate 31m of the distributor 30m corresponding to the blowing hole 22 placed at a position lower than the adjacent blowing hole and the outer-wall plate 21. When the size of the clearance D between the facing plate 31m of the distributor 30m and the outer-wall plate 21 becomes small, an area of the opening 32m between the outer circumferential edge of the facing plate 31m and the outer-wall plate 21 becomes small in proportion to the size of the clearance D. Therefore, in the present embodiment, the opening 32m of each of the plurality of distributors 30m works as a flow-amount adjuster adjusting the flow amount of air guided to the blowing hole 22 corresponding to the distributor 30m.

Therefore, also in the present embodiment, the flow amount of the air blowing from each of the blowing holes can be equalized, and the frictional resistance of the hull B can be reduced in the same manner as in each of the aforementioned embodiments and modifications.

In addition, in the present embodiment, the distributor 30m is configured by the facing plate 31m and the clearance-maintaining member 37m, and since the structure of the distributor 30m is simple, the production cost of the distributor 30m can be reduced in the same manner as in the third embodiment.

In addition, in the present embodiment, the distributor 30m is not provided to the blowing hole 22 placed at the lowest height position; however, the distributor 30m can be provided to the blowing hole 22 placed at the lowest height position.

Fifth Embodiment

Figure 27:
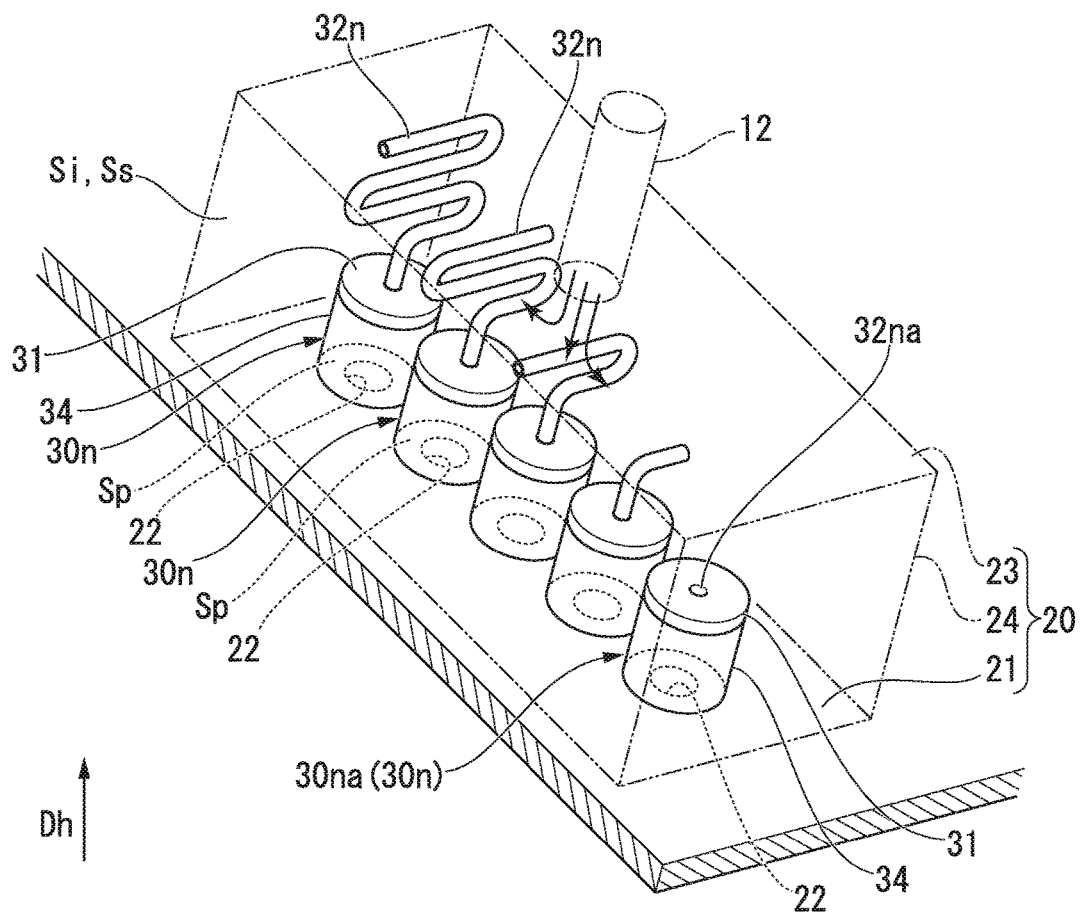
FIG. 27 is a perspective view of a relevant part of a device for reducing frictional resistance according to a fifth embodiment of the present invention.

A distributor 30e of a fifth embodiment will be explained using FIG. 27.

A distributor 30n of the present embodiment is a modification of the distributor 30 of the first embodiment. A partition member in the distributor 30n of the present embodiment includes a cylinder 34 and a cover 31 in the same manner as in the first embodiment. One side of the cylinder 34 is joined to a portion on the outer-wall plate 21 and around one blowing hole 22. The other side of the cylinder 34 is connected to the cover 31 and an opening on the other side of the cylinder 34 is covered by the cover 31. A partial space Sp is formed by a space which is surrounded by the outer-wall plate 21, the cylinder 34 and cover 31 of the distributor 30. A pipe 32n guiding the air of the supply-pipe-side space Ss to the partial space Sp is connected to the cover 31.

In the present embodiment, an inner diameter of the pipe 32n of each of the plurality of distributors 30n is the same, but a length of the pipe 32n is different for each of the distributors 30n. Specifically, the length of the pipe 32n of the distributor 30n corresponding to the blowing hole 22 placed at a position higher than the adjacent blowing hole is shorter than the length of the pipe 32n of the distributor 30n corresponding to the blowing hole 22 placed at a position lower than the adjacent blowing hole. When the length of the pipe 32n becomes long, the resistance of the pipe to the air passing therethrough becomes large and the flowing amount of the air passing through the pipe 32n becomes small. Therefore, in the present embodiment, the pipe 32n of each of the plurality of distributors 30n works as a flow-amount adjuster adjusting the flow amount of air guided to the blowing hole 22 corresponding to the distributor 30n. In addition, the length of the pipe of the distributor 30na corresponding to the blowing hole 22 placed at the lowest position is zero here.

That is, the pipe is not connected to the distributor 30na corresponding to the blowing hole 22 placed at the lowest position. In the cover 31 of the distributor 30na, a penetration hole 32na having the same inner diameter as an inner diameter of the pipe 32n connected to the other distributors 30n is formed.

Therefore, also in the present embodiment, the flow amount of the air blowing from each of the blowing holes can be equalized, and the frictional resistance of the hull B can be reduced in the same manner as in each of the aforementioned embodiments and modifications.

In addition, in the present embodiment, the pipe 32n is not provided to the distributor 30na corresponding to the blowing hole 22 placed at the lowest height position; however, the pipe 32n can also be provided to this distributor 30na. In addition, in the present embodiment, the pipe 32n is bent, but the pipe 32n may not be bent.

However, the length of the pipe 32n can be easily secured in the chamber 20 if the pipe 32n is bent. In this manner, when the pipe 32n is bent, a curve thereof becomes the resistance of the pipe to the air. Therefore, when the flow amount of air passing through the pipe 32n is configured, the number of curves of the pipe 32n is preferable to be considered.

A Variety of Modifications

The modifications shown in FIGS. 6 to 9 are the modifications with respect to the first embodiment. However, of these modifications, the modifications shown in FIGS. 7 to 9 can be applied to the second embodiment, the first modification of the second embodiment, the fourth modification of the second embodiment, the fifth modification of the second embodiment and the fifth embodiment. In addition, the modification shown in FIG. 8 can be applied to the first modification and fourth modification of the second embodiment.

In the first embodiment, each modification of the first embodiment, the second embodiment, each modification of the second embodiment and the fifth embodiment, the distributor is provided to each of all the blowing holes 22. However, also in these embodiments and modifications, the distributor, which imparts a resistance to the flow of air and reduces air pressure, may not be provided to the blowing hole 22 which the highest water pressure from the outside of the hull is subjected to and which is placed at the lowest position as described in the third embodiment and fourth embodiment. That is, the distributor will be provided at least to the plurality of blowing holes 22 except for the blowing hole 22 placed at the lowest position. In this manner, the production cost can be suppressed by excepting the distributor corresponding to the blowing hole 22 placed at the lowest position. In addition, even when the distributor corresponding to the blowing hole 22 placed at the lowest position is excepted, the flow amount of air blown out from all of the blowing holes 22 formed in the outer-wall plate 21 of the chamber 20 is adjusted by the flow-amount adjuster of the distributor of the blowing hole 22 except for the blowing hole 22 placed at the lowest position so as to be equalized in each blowing hole 22.

Figure 28:
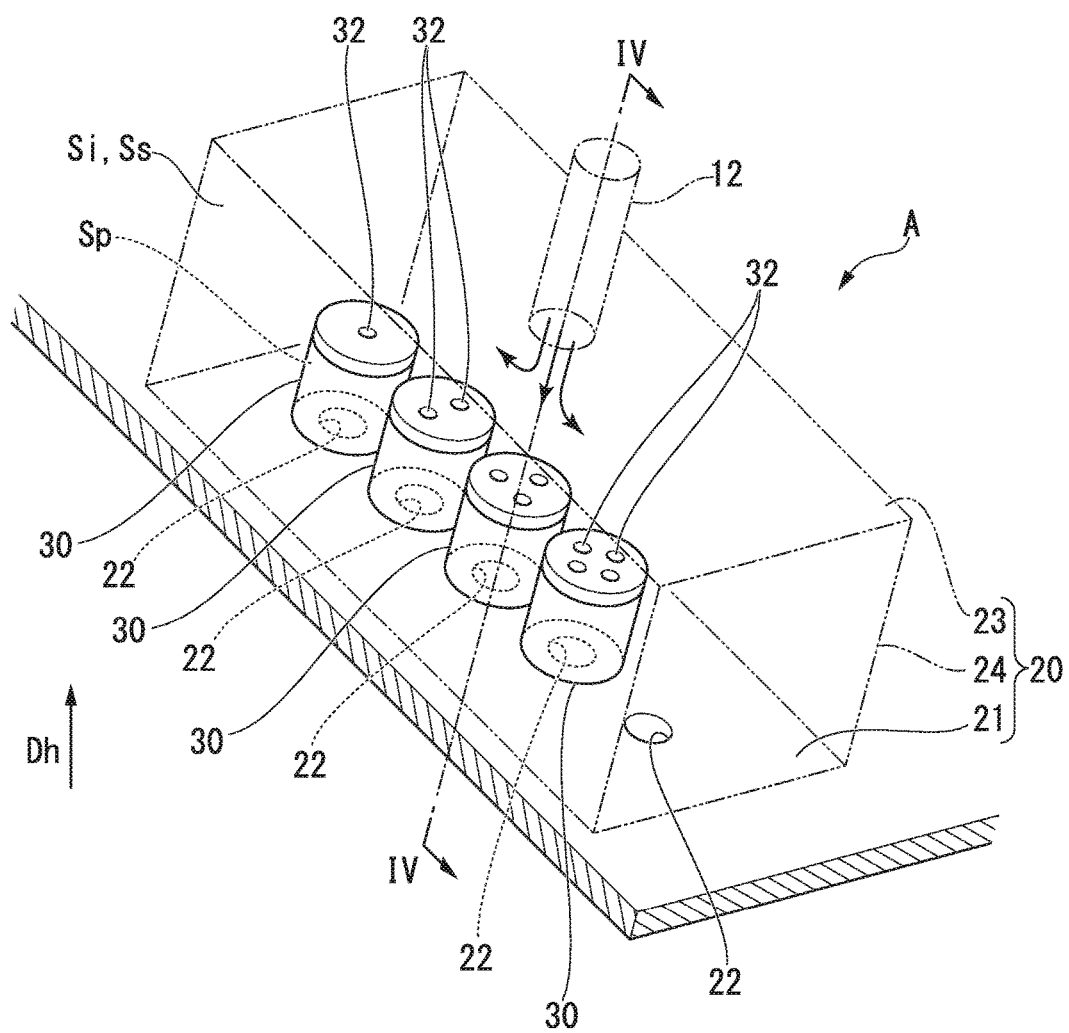
FIG. 28 is a perspective view of a relevant part of a device for reducing frictional resistance according to a fifth modification of the first embodiment of the present invention.
Figure 29:
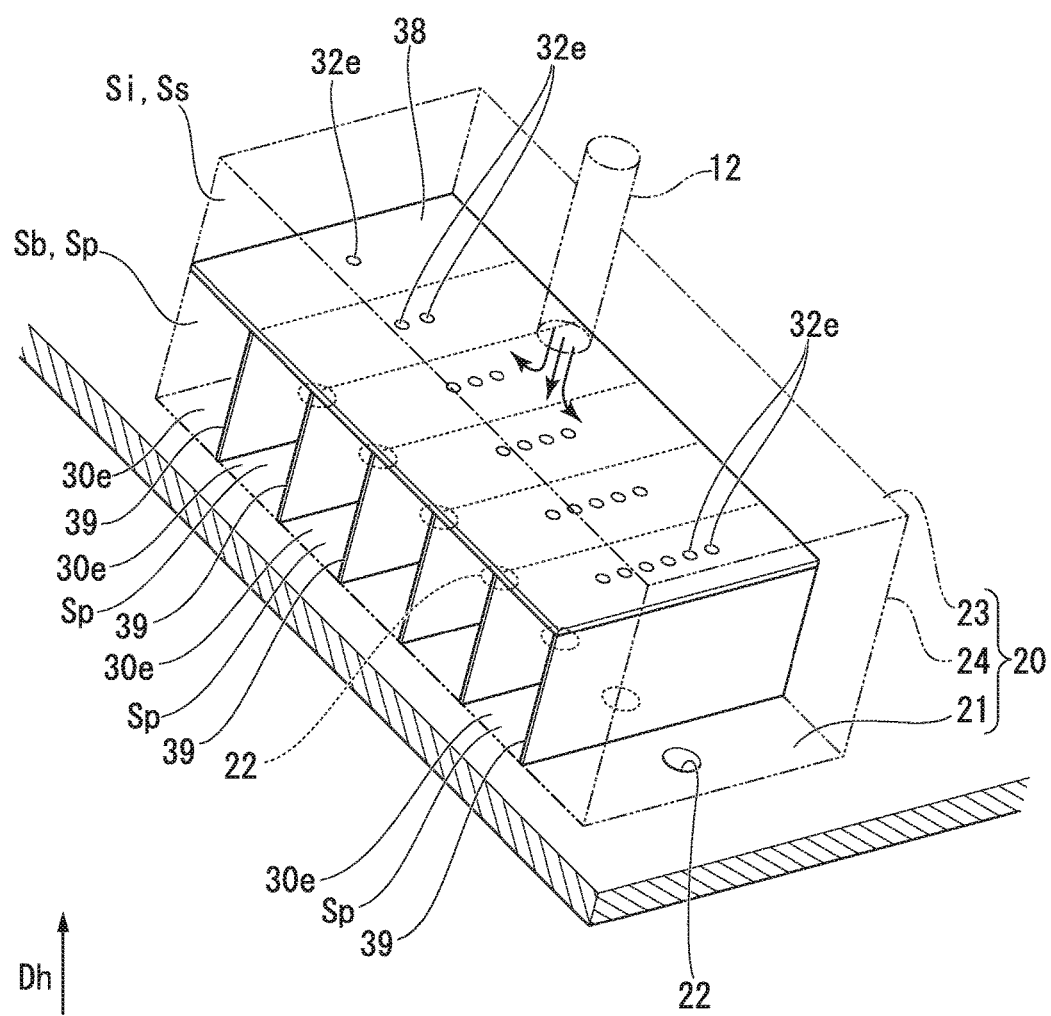
FIG. 29 is a perspective view of a relevant part of a device for reducing frictional resistance according to a sixth modification of the second embodiment of the present invention.

Specifically, with respect to the first embodiment, as shown in FIG. 28, of the plurality of blowing hole 22 formed in the outer-wall plate 21 of the chamber 20, the distributor may not be provided to the blowing hole 22 placed at the lowest position. Also, with respect to the second embodiment, as shown in FIG. 29, of the plurality of blowing holes 22 formed in the outer-wall plate 21 of the chamber 20, the distributor may not be provided to the blowing hole 22 placed at the lowest position.

The flow-amount adjuster of the first embodiment is a penetration hole 32, the number of which is different for each of the distributors 30. However, in the first embodiment, instead of this flow-amount adjuster, any of the flow-amount adjusters shown in FIGS. 13 to 20 can be used. In addition, the flow-amount adjuster of the third embodiment is the penetration hole 32e, the opening area of which is different for each of the distributors 30k. However, in the third embodiment, instead of this flow-amount adjuster, any of the flow-amount adjusters of the first embodiment and second embodiment and any of the flow-amount adjusters shown in FIGS. 14 to 20 can be applied. The fifth embodiment is a modification of the first embodiment, but the flow-amount adjuster shown in the fifth embodiment can be applied to the second embodiment, the first modification of the second embodiment and the third embodiment.

That is, the flow-amount adjuster of the distributor can be a variety of forms if it is an adjuster adjusting a pressure loss of when the air flows into the partial space Sp from the supply-pipe-side space Ss. Thus, the flow-amount adjuster of the distributor can be, for example, in any of the following forms.

(1) A flow-amount adjuster is a penetration hole, the number of which is different for each of the distributors as described in the first embodiment and the second embodiment.

(2) A flow-amount adjuster is a penetration hole, the opening area of which is different for each of the distributors as described in the first modification of the second embodiment.

(3) A flow-amount adjuster is a screen as described in the second modification of the second embodiment.

(4) A flow-amount adjuster is a perforated plate as described in the third modification of the second embodiment.

(5) A flow-amount adjuster is a pipe, the inner diameter (the opening area) of which is different for each of the distributors as described in the fourth modification of the second embodiment.

(6) A flow-amount adjuster is a valve as described in the fifth modification of the second embodiment.

(7) A flow-amount adjuster is a pipe, the length of which is different for each of the distributors as described in the fifth embodiment.

(8) Depending on circumstances, the flow-amount adjuster is an opening provided between the edge of the plate member and a member disposed with clearance so as to face this plate member.

In the aforementioned embodiments, among the plate members forming the chamber 20, a plate facing the outer-wall plate 21 with clearance is served as the supply-pipe-connecting plate 23, and the supply pipe 12 is connected to this supply-pipe-connecting plate 23. However, among the plate members forming the chamber 20, the peripheral-wall plate 24 connected to the outer-wall plate 21 is served as a supply-pipe-connecting plate, and the supply pipe 12 can be connected to this supply-pipe-connecting plate.

Figure 30:
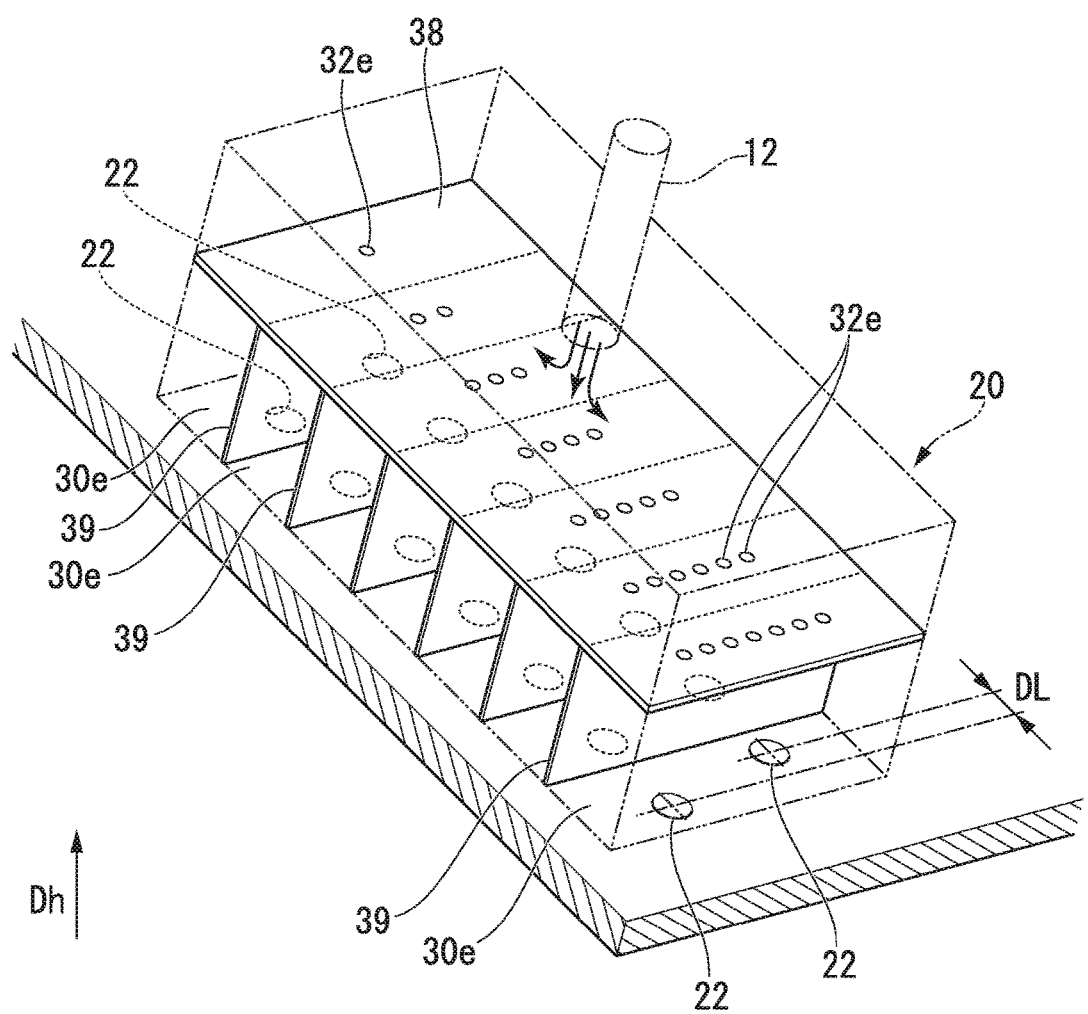
FIG. 30 is a perspective view of a relevant part of a device for reducing frictional resistance according to a modification of an embodiment of the present invention.

In above each embodiment and each modification, one blowing hole 22 corresponds to one distributor. However, for example, as shown in FIG. 30, a plurality of blowing holes 22, 22 can correspond to one distributor 30e. In this case, blowing holes 22, 22 placed at a common position in the height direction Dh correspond to one distributor 30e. Here, the case of a common position in the height direction Dh includes not only the case where the positions of the plurality of blowing holes 22, 22 in the height direction Dh are fully match but also the case where the plurality of blowing holes 22, 22 have an overlapping part DL in the height direction Dh. In addition, FIG. 30 is a modification of the second embodiment, but in the same manner as in the above, also in the first embodiment and each modification thereof, the second embodiment and each modification thereof, the third embodiment, the fourth embodiment, and the fifth embodiment, the plurality of blowing holes 22, 22 being in a common position in the height direction Dh can correspond to one distributor. In addition, in each of the above embodiments and modifications, every opening shape of the blowing hole 22 is a circle, but the shape can be a rectangle, a square, a rhombus, a triangle, a triangle having rounded corners, an oblong, and ellipse, or other shapes.

Figure 31:
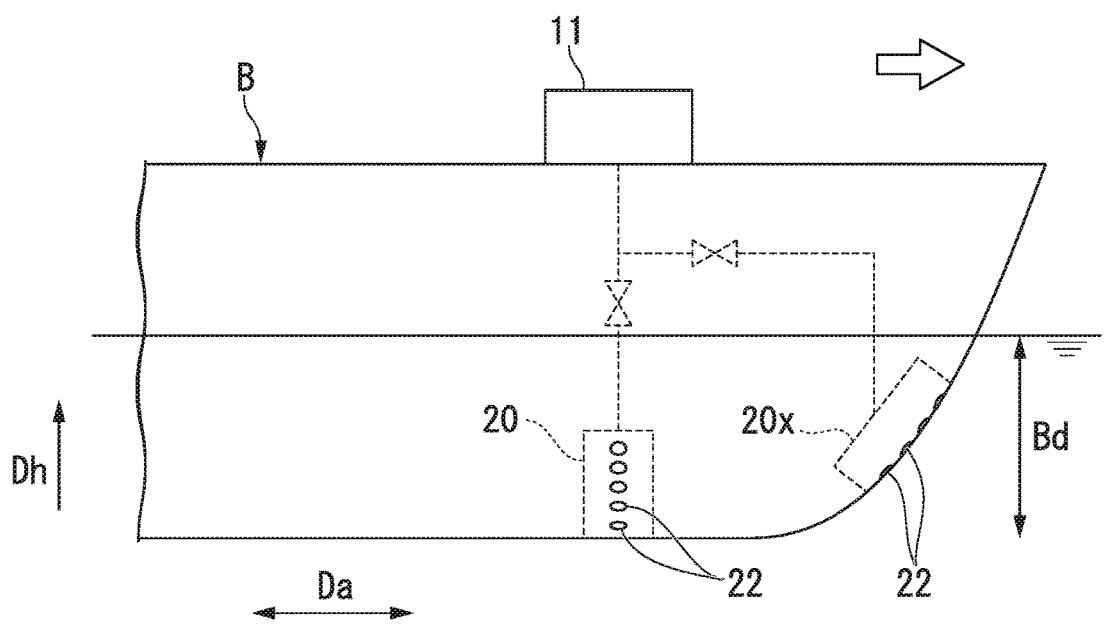
FIG. 31 is an explanatory view showing a structure of a ship according to a modification of an embodiment of the present invention.

In every above each embodiment and each modification, the chamber 20 is provided in the draft part Bd and in a part where a width of the hull B varies when a position of a height direction Dh of the hull B is changed. However, as shown in FIG. 31, a chamber 20x is provided in the draft part Bd and at a part where a position on the outer wall of the hull B varies in the front and rear direction Da of the hull B when a position of the hull B changes in the height direction Dh.

FIELD OF INDUSTRIAL APPLICATION

According to the device for reducing frictional resistance, ship including such a device, and method of reducing frictional resistance of the ship of the present invention, equalization of the flow amount of the air blown out from the plurality of blowing holes and equalization of dispersing along the outboard-wall of the air blown out from the plurality of blowing holes can be achieved. Therefore, the frictional resistance of the ship can be further reduced.

DESCRIPTION OF REFERENCE SIGNS

A: Device for reducing frictional resistance
B: Hull
11: Air-supply device
12: Supply pipe
20, 20x: Chamber
21: Outer-wall plate
22: Blowing hole
23: Supply-pipe-connecting plate
24: Peripheral-wall plate
30, 30a, 30b, 30c, 30d, 30e, 30f, 30g, 30h, 30i, 30j, 30k, 30m, 30n: Distributor
31, 31b, 31c, 31d: Cover
31k, 31m: Facing plate
32, 32a, 32b, 32c, 32d, 32e, 32f, 32k: Penetration hole (Flow-amount adjuster)
32g: Screen (Flow-amount adjuster)
32h: Perforated plate (Flow-amount adjuster)
32i, 32n: Pipe (Flow-amount adjuster)
32j: Valve (Flow-amount adjuster)
34, 34a: Cylinder
35: Baffle plate (Change-direction member)
36: bending pipe (Change-direction member)
37m: Clearance-maintaining member
38: Internal-space-partition plate
39: Blowing-side-partition plate
Sb: Blowing-side space
Si: Internal space
Ss: Supply-pipe-side space
Sp: Partial space

What is claimed is:
1. A device for reducing frictional resistance of a ship, the device comprising:
a chamber which is provided to a draft part of a hull and in which a plurality of blowing holes blowing out a gas into the water of the outside of the hull from different positions to each other in a height direction of the hull are formed;
a supply pipe that supplies the gas to an internal space of the chamber; and
a plurality of distributors, each of which is provided at least to each of the plurality of blowing holes except for the blowing hole placed at the lowest position in the height direction of the plurality of blowing holes, the distributor guiding a part of the gas, which is supplied into the chamber from the supply pipe, to each of the blowing holes,
wherein each of the plurality of distributors has a flow-amount adjuster that adjusts a flow amount of the gas guided to the blowing hole corresponding to the dis- tributor so that the flow amount of the gas blown out from the plurality of blowing holes is equalized in each of the blowing holes.

2. The device for reducing frictional resistance of a ship according to claim 1, wherein
the distributor is provided to all of the plurality of blowing holes formed in the chamber.

3. The device for reducing frictional resistance of a ship according to claim 1, wherein
the higher the height position of the corresponding blowing hole is, the more the flow-amount adjuster of the plurality of distributors reduces the flow amount of the gas guided to the corresponding blowing hole.

4. The device for reducing frictional resistance of a ship according to claim 3, wherein
the plurality of distributors comprises:
a partition member sectioning the internal space of the chamber to a supply-pipe-side space communicating with an opening of the supply pipe connecting to the chamber and a partial space including a space of the corresponding blowing hole, and
wherein the flow-amount adjuster is provided to the partition member.

5. The device for reducing frictional resistance of a ship according to claim 4, wherein
the flow-amount adjuster of the distributor is configured of at least one penetration hole formed in the partition member and penetrating to the partial space side from the supply-pipe-side space, and
the number of penetration holes of each of the plurality of distributors is different for each of the plurality of distributors.

6. The device for reducing frictional resistance of a ship according to claim 5, wherein
of plate members forming the chamber, the penetration hole is not formed on an extension of the blowing hole in the penetration direction of the blowing hole in an outer-wall plate in which the blowing hole corresponding to the distributor is formed.

7. The device for reducing frictional resistance of a ship according to claim 5, wherein
a change-direction member changing the flow direction of the gas from the penetration hole is provided in the partial space.

8. The device for reducing frictional resistance of a ship according to claim 4, wherein
the flow-amount adjuster of the distributor is formed in the partition member and is configured of a penetration hole penetrating to the partial space side from the supply-pipe-side space, and
an opening area of the penetration hole of each of the plurality of distributors is different for each of the plurality of distributors.

9. The device for reducing frictional resistance of a ship according to claim 4, wherein
the flow-amount adjuster of each of the plurality of distributors is a screen provided to the partition member and formed a plurality of openings through which the gas passes to the partial space side from the supply-pipe-side space, and
a size of openings of the screen of each of the plurality of distributors is different for each of the plurality distributors.

10. The device for reducing frictional resistance of a ship according to claim 4, wherein
the flow-amount adjuster of each of the plurality of distributors is configured of a pipe which is provided to the partition member and through which the gas passes to the partial space side from the supply-pipe-side space, and
an opening area of the pipe of each of the plurality of distributors is different for each of the plurality of distributors.

11. The device for reducing frictional resistance of a ship according to claim 4, wherein
the flow-amount adjuster of each of the plurality of distributors is configured of a pipe which is provided to the partition member and through which the gas passes to the partial space side from the supply-pipe-side space, and
a length of the pipe of each of the plurality of distributors is different for each of the plurality of distributors.

12. The device for reducing frictional resistance of a ship according to claim 4, wherein
the flow-amount adjuster of each of the plurality of distributors is configured of a valve which is provided to the partition member and through which the gas passes to the partial space side from the supply-pipe-side space, and
a valve opening position of the valve of each of the plurality of distributors is different for each of the plurality of distributors.

13. The device for reducing frictional resistance of a ship according to claim 4, wherein
the partition member of the distributor comprises a cylinder and a cover, wherein the cylinder forms the partial space in the chamber with one end of the cylinder being connected to the outer-wall plate in which the corresponding blowing hole is formed and which is included in the plate members forming the chamber, and wherein the cover covers an opening of the other end of the cylinder.

14. The device for reducing frictional resistance of a ship according to claim 4, wherein
the partition member of the plurality of distributors comprises:
an internal-space-partition plate that divides the internal space of the chamber into two spaces consisting of the supply-pipe-side space and a blowing-side space defined as another space, and
a blowing-side-partition plate that divides the blowing-side space into a plurality of partial spaces by sectioning the blowing-side space with respect to each blowing hole, and
wherein the flow-amount adjuster is provided to the internal-space-partition plate.

15. The device for reducing frictional resistance of a ship according to claim 4, wherein
the partition member of the distributor comprises:
a facing plate facing the corresponding blowing hole and facing a portion around the corresponding blowing hole in the outer-wall plate in which the blowing hole is formed and which is included in the plate members forming the chamber, and the facing plate made contact with the outer-wall plate, and
wherein the flow-amount adjuster is provided to the facing plate.

16. The device for reducing frictional resistance of a ship according to claim 4, wherein
the partition member of the distributor comprises:
a facing plate facing the corresponding blowing hole and a portion around the corresponding blowing hole in the outer-wall plate in which the blowing hole is formed and which is included in the plate members forming the chamber with a clearance between the facing plate member and the outer-wall plate, and a clearance-maintaining member maintaining the clearance between the facing plate and the outer-wall plate, wherein the flow-amount adjuster is configured of an opening provided between the edge of the facing plate and the outer-wall plate, and wherein an area of the opening of each of the plurality of distributors is different for each of the plurality of distributors.

17. The device for reducing frictional resistance of a ship according to claim 1, wherein shapes and opening areas of an opening of each of the plurality of blowing holes are the same with each other.

18. The device for reducing frictional resistance of a ship according to claim 1, wherein the blowing holes at the same position in the height direction with each other are formed in the chamber, and the distributor is provided to each of the blowing holes at the same position in the height direction with each other.

19. A ship comprising:

the hull, and the device for reducing frictional resistance of a ship according to claim 1.

20. A method for reducing frictional resistance of a ship, the method comprising:

a gas supplying step supplying a gas to an internal space of a chamber, the chamber which is provided to a draft part of a hull and in which a plurality of blowing holes blowing the gas into the water of the outside of the hull from different positions to each other in a height direction of the hull are formed; and a gas distributing step guiding a part of the gas, which is supplied inside the chamber, to the blowing holes in each of the plurality of blowing holes, wherein the gas distributing step comprises the step of adjusting a flow amount of the gas guided to the blowing holes so that the flow amount of the gas blown out from the plurality of blowing holes is equalized in each of the plurality of blowing holes.

21. The method for reducing frictional resistance of a ship according to claim 20, wherein in the gas distributing step, the higher the height position of the corresponding blowing hole is, the more the flow amount of the gas guided to the corresponding blowing hole is reduced.

22. The method for reducing frictional resistance of a ship according to claim 20, wherein in the gas distributing step, the higher the height position of the blowing hole is, the more a pressure loss of the gas, which is supplied into the chamber, increases while being guided to the blowing hole.

* * * * *